(12) United States Patent
Garcia Azorero et al.

(10) Patent No.: US 12,418,856 B2
(45) Date of Patent: Sep. 16, 2025

(54) PARTIAL SUPPORT OF ACCESS NETWORK INFORMATION

(71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Hong Zhang, Gothenburg (SE); Yunjie Lu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 427 days.

(21) Appl. No.: 17/800,054

(22) PCT Filed: Feb. 17, 2021

(86) PCT No.: PCT/IB2021/051354
§ 371 (c)(1),
(2) Date: Aug. 16, 2022

(87) PCT Pub. No.: WO2021/165856
PCT Pub. Date: Aug. 26, 2021

(65) Prior Publication Data
US 2023/0146343 A1  May 11, 2023

Related U.S. Application Data

(60) Provisional application No. 62/977,635, filed on Feb. 17, 2020.

(51) Int. Cl.
*H04W 48/18* (2009.01)
*H04W 4/02* (2018.01)

(52) U.S. Cl.
CPC ............. *H04W 48/18* (2013.01); *H04W 4/02* (2013.01)

(58) Field of Classification Search
CPC ........ H04W 48/18; H04W 4/02; H04L 67/52; H04L 65/1016
USPC ...................................................... 455/435.2
See application file for complete search history.

(56) References Cited

PUBLICATIONS

3rd Generation Partnership Project; Technical Specification Group Core Network and Terminals; 5G System; Session Management Policy Control Service; Stage 3, 650 Route des Lucioles—Sophia Antipolis (Year: 2019).*

(Continued)

*Primary Examiner* — Tanmay K Shah
(74) *Attorney, Agent, or Firm* — Sonoda & Kobayashi Intellectual Property Law; Sarvjit S. Patil

(57) ABSTRACT

Embodiments of a method performed by a Session Management Function (SMF) for providing Access Network (AN) are disclosed. In some embodiments the method comprises receiving from a Policy Control Function (PCF) a request for AN information. The method also includes determining whether the AN does not support reporting of the requested AN information. The method also includes upon determining that the AN does not support reporting of the requested AN information, sending, to the PCF, a notification that the AN does not support reporting of the requested AN information. The method also includes upon determining that the AN does support reporting of the requested AN information: acquiring the requested AN information and sending the requested AN information to the PCF.

19 Claims, 40 Drawing Sheets

(56) References Cited

PUBLICATIONS

3rd Generation Partnership Project; Technical Specification Group Services and System Aspects; System architecture for the 5G System (SGS); Stage 2, 650 Route des Lucioles—Sophia Antipolis (Year: 2019).*

Author Unknown, "Technical Specification Group Services and System Aspects; IP Multimedia Subsystem (IMS); Stage 2 (Release 16)," Technical Specification 23.228, Version 16.3.0, Dec. 2019, 3GPP Organizational Partners, 349 pages.

Author Unknown, "Technical Specification Group Services and System Aspects; System Architecture for the 5G System (5GS); Stage 2 (Release 16)," Technical Specification 23.501, Version 16.3.0, Dec. 2019, 3GPP Organizational Partners, 417 pages.

Author Unknown, "Technical Specification Group Services and System Aspects; Policy and charging control framework for the 5G System (5GS); Stage 2 (Release 16)," Technical Specification 23.503, Version 16.3.0, Dec. 2019, 3GPP Organizational Partners, 112 pages.

Author Unknown, "Technical Specification Group Core Network and Terminals; 5G System; Session Management Policy Control Service; Stage 3 (Release 16)," Technical Specification 29.512, Version 16.3.0, Dec. 2019, 3GPP Organizational Partners, 178 pages.

Author Unknown, "Technical Specification Group Core Network and Terminals; 5G System; Policy Authorization Service; Stage 3 (Release 16)," Technical Specification 29.514, Version 16.3.0, Dec. 2019, 3GPP Organizational Partners, 143 pages.

Author Unknown, "Technical Specification Group Core Network and Terminals; 5G System; Access and Mobility Management Services; Stage 3 (Release 16)," Technical Specification 29.518, Version 16.2.0, Dec. 2019, 3GPP Organizational Partners, 226 pages.

International Search Report and Written Opinion for International Patent Application No. PCT/IB2021/051354, mailed Apr. 22, 2021, 20 pages.

Written Opinion for International Patent Application No. PCT/IB2021/051354, mailed Oct. 4, 2021, 13 pages.

International Preliminary Report on Patentability for International Patent Application No. PCT/IB2021/051354, mailed May 27, 2022, 34 pages.

Author Unknown, "5G; 5G System; Session Management Policy Control Service; Stage 3," Technical Specification 129.512, Version 16.5.0, Aug. 2020, ETSI, 212 pages.

Author Unknown, "Technical Specification Group Core Network and Terminals; 5G System; Policy Authorization Service; Stage 3 (Release 15)," Technical Specification 29.514, Version 15.1.0, Sep. 2018, 3GPP Organizational Partners, 81 pages.

Author Unknown, "Technical Specification Group Core Network and Terminals; 5G System; Policy Authorization Service; Stage 3 (Release 16)," Technical Specification 29.514, Version 16.5.0, Jun. 2020, 3GPP Organizational Partners, 166 pages.

Result of Consultation for European Patent Application No. 21707797.3, mailed Oct. 26, 2023, 12 pages.

* cited by examiner

******** Start of First Change to 3GPP 29.512 ********

> * 1st Change *

5.6.1 General

This subclause specifies the application data model supported by the API.

The Npcf_SMPolicyControl API allows the SMF to retrieve the session management related policy from the PCF as defined in 3GPP TS 23.503 [6].

Table 5.6.1-1 specifies the data types defined for the Npcf_SMPolicyControl service based interface protocol.

Table 5.6.1-1: Npcf_SMPolicyControl specific Data Types

| Data type | Section defined | Description | Applicability |
|---|---|---|---|
| 5GSmCause | 5.6.3.2 | Indicates the 5GSM cause code value. | RAN-NAS-Cause |
| AccNetChargingAddress | 5.6.2.35 | Identifies the address of the network node performing charging and used for charging applications. | |
| AccNetChId | 5.6.2.23 | Contains the access network charging identifier for the PCC rule(s) or whole PDU session. | |
| AccuUsageReport | 5.6.2.18 | Contains the accumulated usage report information. | UMC |
| AfSigProtocol | 5.6.3.10 | Indicates the protocol used for signalling between the UE and the AF | ProvAFsignalFlow |
| AppDetectionInfo | 5.6.2.22 | Contains the detected application's traffic information. | ADC |
| AuthorizedDefaultQos | 5.6.2.34 | Authorized Default QoS | |
| ChargingData | 5.6.2.11 | Contains charging related parameters. | |
| ChargingInformation | 5.6.2.17 | Contains the addresses of the charging functions. | |
| ConditionData | 5.6.2.9 | Contains conditions for applicability of a rule. | |
| CreditManagementStatus | 5.6.3.16 | Indicates the reason of the credit management session failure. | |
| ErrorReport | 5.6.2.36 | Contains the rule reports. | |
| FailureCause | 5.6.3.14 | Indicates the cause of the failure in a Partial Success Report. | |
| FailureCode | 5.6.3.9 | Indicates the reason of the PCC rule failure. | |
| FlowDescription | 5.6.3.2 | Defines a packet filter for an IP flow. | |
| FlowDirection | 5.6.3.3 | Indicates the direction of the service data flow. | |
| FlowDirectionRm | 5.6.3.15 | This data type is defined in the same way as the "FlowDirection" data type, but with the OpenAPI "nullable: true" property. | |
| FlowInformation | 5.6.2.14 | Contains the flow information. | |
| MeteringMethod | 5.6.3.5 | Indicates the metering method. | |
| NetLocAccessSupport | 5.6.3.x1 | Indicates the access network support of the report of the requested access network information. | NetLoc |
| PacketFilterContent | 5.6.3.2 | Defines a packet filter for an IP flow. | |
| PacketFilterInfo | 5.6.2.30 | Contains the information from a single packet filter sent from the SMF to the PCF. | |
| PartialSuccessReport | 5.6.2.33 | Includes the information reported by the SMF when some of the PCC rules are not successfully installed/activated. | |
| PccRule | 5.6.2.6 | Contains the PCC rule information. | |

(Continued in Fig. 13B)

Fig. 13A (Continued from Fig. 13A)

| | | | |
|---|---|---|---|
| PolicyControlRequestTrigger | 5.6.3.6 | Contains the policy control request trigger(s). | |
| QosCharacteristics | 5.6.2.16 | Contains QoS characteristics for a non-standardized or non-configured 5QI. | |
| QosData | 5.6.2.8 | Contains the QoS parameters. | |
| QosFlowUsage | 5.6.3.13 | Indicates a QoS flow usage information. | |
| QosNotificationControlInfo | 5.6.2.32 | Contains the QoS Notification Control Information. | |
| RanNasRelCause | 5.6.2.28 | Contains the RAN/NAS release cause. | RAN-NAS-Cause |
| RedirectAddressType | 5.6.3.12 | Indicates the redirect address type. | |
| RedirectInformation | 5.6.2.13 | Contains the redirect information. | |
| ReportingLevel | 5.6.3.4 | Indicates the reporting level. | |
| RequestedQos | 5.6.2.31 | Contains the QoS information requested by the UE | |
| RequestedRuleData | 5.6.2.24 | Contains rule data requested by the PCF to receive information associated with PCC rules. | |
| RequestedRuleDataType | 5.6.3.7 | Contains the type of rule data requested by the PCF. | |
| RequestedUsageData | 5.6.2.25 | Contains usage data requested by the PCF requesting usage reports for the corresponding usage monitoring data instances. | |
| RuleOperation | 5.6.3.11 | Indicates a UE initiated resource operation that causes a request for PCC rules. | |
| RuleReport | 5.6.2.27 | Reports the status of PCC. | |
| RuleStatus | 5.6.3.8 | Indicates the status of PCC or session rule. | |
| ServingNfIdentity | 5.6.2.38 | Contains the serving Network Function identity. | |
| SessionRule | 5.6.2.7 | Contains session level policy information. | |
| SessionRuleFailureCode | 5.6.3.17 | Indicates the reason of the session rule failure. | |
| SessionRuleReport | 5.6.2.37 | Reports the status of session rule. | |
| SmPolicyControl | 5.6.2.2 | Contains the parameters to request the SM policies and the SM policies authorized by the PCF. | |
| SmPolicyContextData | 5.6.2.3 | Contains the parameters to create individual SM policy resource. | |
| SmPolicyDecision | 5.6.2.4 | Contains the SM policies authorized by the PCF. | |
| SmPolicyNotification | 5.6.2.5 | Contains the update of the SM policies | |
| SmPolicyDeleteData | 5.6.2.15 | Contains the parameters to be sent to the PCF when the individual SM policy is deleted. | |
| SmPolicyUpdateContextData | 5.6.2.19 | Contains the met policy control request trigger(s) and corresponding new value(s) or the error report of the policy enforcement. | |
| TerminationNotification | 5.6.2.21 | Termination Notification | |
| TrafficControlData | 5.6.2.10 | Contains parameters determining how flows associated with a PCCRule are treated (blocked, redirected, etc). | |
| UeCampingRep | 5.6.2.26 | Contains the current applicable values corresponding to the policy control request triggers. | |
| UeInitiatedResourceRequest | 5.6.2.29 | Indicates a UE requests specific QoS handling for selected SDF. | |
| UpPathChgEvent | 5.6.2.20 | Contains the UP path change event subscription from the AF | TSC |
| UsageMonitoringData | 5.6.2.12 | Contains usage monitoring related control information. | UMC |

Fig. 13B

Table 5.6.1-2 specifies data types re-used by the Npcf_SMPolicyControl service based interface protocol from other specifications, including a reference to their respective specifications and when needed, a short description of their use within the Npcf_SMPolicyControl service based interface.

Table 5.6.1-2: Npcf_SMPolicyControl re-used Data Types

| Data type | Reference | Comments | Applicability |
|---|---|---|---|
| 5GMmCause | 3GPP TS 29.571 [11] | Contains the cause value of 5GMM protocol. | RAN-NAS-Cause |
| 5Qi | 3GPP TS 29.571 [11] | Unsigned integer representing a 5G QoS Identifier (see subclause 5.7.2.1 of 3GPP TS 23.501 [2]), within the range 0 to 255. | |
| 5QiPriorityLevel | 3GPP TS 29.571 [11] | Unsigned integer indicating the 5QI Priority Level (see subclauses 5.7.3.3 and 5.7.4 of 3GPP TS 23.501 [2]), within the range 1 to 127. Values are ordered in decreasing order of priority, i.e. with 1 as the highest priority and 127 as the lowest priority. | |
| 5QiPriorityLevelRm | 3GPP TS 29.571 [11] | This data type is defined in the same way as the "5QiPriorityLevel" data type, but with the OpenAPI "nullable: true" property. | |
| AccessType | 3GPP TS 29.571 [11] | The identification of the type of access network. | |
| Ambr | 3GPP TS 29.571 [11] | Session AMBR | |
| AnGwAddress | 3GPP TS 29.514 [17] | Carries the control plane address of the access network gateway.(NOTE) | |
| ApplicationChargingId | 3GPP TS 29.571 [11] | Application provided charging identifier allowing correlation of charging information | AF_Charging_Identifier |
| Arp | 3GPP TS 29.571 [11] | ARP | |
| AverWindow | 3GPP TS 29.571 [11] | Averaging Window | |
| AverWindowRm | 3GPP TS 29.571 [11] | This data type is defined in the same way as the "AverWindow" data type, but with the OpenAPI "nullable: true" property. | |
| BitRate | 3GPP TS 29.571 [11] | String representing a bit rate that shall be formatted as follows:<br><br>pattern: "^\d+(\.\d+)?(bps\|Kbps\|Mbps\|Gbps\|Tbps)$"<br>Examples:<br>"125 Mbps", "0.125 Gbps", "125000 Kbps" | |
| BitRateRm | 3GPP TS 29.571 [11] | This data type is defined in the same way as the "BitRate" data type, but with the OpenAPI "nullable: true" property. | |
| ChargingId | 3GPP TS 29.571 [11] | Charging identifier allowing correlation of charging information | |
| ContentVersion | 3GPP TS 29.514 [17] | Indicates the content version of a PCC rule. It uniquely identifies a version of the PCC rule as defined in subclause 4.2.6.2.14. | RuleVersioning |

(Continued in Fig. 13D)

Fig. 13C (Continued from Fig. 13C)

| | | | |
|---|---|---|---|
| DateTime | 3GPP TS 29.571 [11] | String with format "date-time" as defined in OpenAPI Specification [10]. | |
| DateTimeRm | 3GPP TS 29.571 [11] | This data type is defined in the same way as the "DateTime" data type, but with the OpenAPI "nullable: true" property. | |
| DnaiChangeType | 3GPP TS 29.571 [11] | Describes the types of DNAI change. | |
| Dnn | 3GPP TS 29.571 [11] | The DNN the user is connected to. | |
| DurationSec | 3GPP TS 29.571 [11] | Identifies a period of time in units of seconds. | |
| DurationSecRm | 3GPP TS 29.571 [11] | This data type is defined in the same way as the "DurationSec" data type, but with the OpenAPI "nullable: true" property. | |
| EthFlowDescription | 3GPP TS 29.514 [17] | Defines a packet filter for an Ethernet flow. | |
| FinalUnitAction | 3GPP TS 32.291 [19] | Indicates the action to be taken when the user's account cannot cover the service cost. | |
| FlowStatus | 3GPP TS 29.514 [17] | Describes whether the IP flow(s) are enabled or disabled. The value "REMOVED" is not applicable to Npcf_SMPolicyControl service. | |
| Gpsi | 3GPP TS 29.571 [11] | Identifies a GPSI. | |
| GroupId | 3GPP TS 29.571 [11] | Identifies a group of internal globally unique ID. | |
| Guami | 3GPP TS 29.571 [11] | Globally Unique AMF Identifier. | |
| IpIndex | 3GPP TS 29.519 [15] | Information that identifies which IP pool or external server is used to allocate the IP address. | |
| Ipv4Addr | 3GPP TS 29.571 [11] | Identifies an Ipv4 address. | |
| Ipv6Addr | 3GPP TS 29.571 [11] | Identifies an IPv6 address. | |
| Ipv6Prefix | 3GPP TS 29.571 [11] | The Ipv6 prefix allocated for the user. | |
| MacAddr48 | 3GPP TS 29.571 [11] | MAC Address. | |
| MaxDataBurstVol | 3GPP TS 29.571 [11] | Maximum Data Burst Volume | |
| MaxDataBurstVolRm | 3GPP TS 29.571 [11] | This data type is defined in the same way as the "MaxDataBurstVol" data type, but with the OpenAPI "nullable: true" property. | |
| NetworkId | 3GPP TS 29.571 [11] | The identification of the Network. | |
| NfInstanceId | 3GPP TS 29.571 [11] | The NF instance identifier. | |
| NgApCause | 3GPP TS 29.571 [11] | Contains the cause value of NgAP protocol. | RAN-NAS-Cause |
| PacketDelBudget | 3GPP TS 29.571 [11] | Packet Delay Budget | |
| PacketErrRate | 3GPP TS 29.571 [11] | Packet Error Rate | |
| PacketLossRateRm | 3GPP TS 29.571 [11] | This data type is defined in the same way as the "PacketLossRate" data type, but with the OpenAPI "nullable: true" property. | |
| PduSessionId | 3GPP TS 29.571 [11] | The identification of the PDU session. | |
| PduSessionType | 3GPP TS 29.571 [11] | Indicate the type of a PDU session | |
| Pei | 3GPP TS 29.571 [11] | The Identification of a Permanent Equipment. | |
| PolicyAssociationReleaseCause | 3GPP TS 29.507 [25] | The cause why the PCF requests the termination of the policy association | |
| PresenceInfo | 3GPP TS 29.571 [11] | Contains the information which describes a Presence Reporting Area. | PRA |
| PresenceInfoRm | 3GPP TS 29.571 [11] | This data type is defined in the same way as the "PresenceInfo" data type, but with the OpenAPI "nullable: true" property. | |
| ProblemDetails | 3GPP TS 29.571 [11] | Contains a detailed information about an error. | |
| QosNotifType | 3GPP TS 29.514 [17] | Indicates whether the GBR targets for the indicated SDFs are "NOT_GUARANTEED" or "GUARANTEED" again. | |
| QosResourceType | 3GPP TS 29.571 [11] | Indicates whether the resource type is GBR, delay critical GBR, or non-GBR. | |
| RatingGroup | 3GPP TS 29.571 [11] | Identifier of a rating group | |
| RatType | 3GPP TS 29.571 [11] | The identification of the RAT type. | |
| RouteToLocation | 3GPP TS 29.571 [11] | A traffic routes to applications location. | TSC |
| ServiceId | 3GPP TS 29.571 [11] | Identifier of a service | |

(Continued in Fig. 13E)

Fig. 13D (Continued from Fig. 13D)

| | | |
|---|---|---|
| Snssai | 3GPP TS 29.571 [11] | Identifies the S-NSSAI. |
| SubscribedDefaultQos | 3GPP TS 29.571 [11] | Subscribed Default QoS. |
| Supi | 3GPP TS 29.571 [11] | The identification of the user (i.e. IMSI, NAI). |
| SupportedFeatures | 3GPP TS 29.571 [11] | Used to negotiate the applicability of the optional features defined in table 5.8-1. |
| TraceData | 3GPP TS 29.571 [11] | |
| TimeZone | 3GPP TS 29.571 [11] | Contains the user time zone information. |
| Uri | 3GPP TS 29.571 [11] | URI. |
| UserLocation | 3GPP TS 29.571 [11] | Contains the user location |
| Volume | 3GPP TS 29.122 [32] | Unsigned integer identifying a volume in units of bytes. |
| VolumeRm | 3GPP TS 29.122 [32] | This data type is defined in the same way as the "VolumeRm" data type, but with the OpenAPI "nullable: true" property. |
| NOTE: "AnGwAddr" data structure is only applicable to the 5GS and EPC/E-UTRAN interworking scenario as defined in Annex B. | | |

* 2nd Change *

5.6.2.26  Type UeCampingRep

Table 5.6.2.26-1: Definition of type UeCampingRep

| Attribute name | Data type | P | Cardinality | Description | Applicability |
|---|---|---|---|---|---|
| accessType | AccessType | O | 0..1 | The Access Type where the served UE is camping. | |
| ratType | RatType | O | 0..1 | The RAT Type where the served UE is camping. | |
| servNfId | ServingNfIdentity | O | 0..1 | Contains the serving network function identity. | |
| servingNetwork | NetworkId | O | 0..1 | The serving network where the served UE is camping. | |
| userLocationInfo | UserLocation | O | 0..1 | The location of the served UE is camping. | |
| ueTimeZone | TimeZone | O | 0..1 | The time zone where the served UE is camping. | |
| netLocAccSupp | NetLocAccessSupport | O | 0..1 | Indicates the access network does not support the report of the requested access network information. The absence of this attribute indicates that the access network supports access network information reporting. | NetLoc |

Fig. 13E

| *** 3rd Change *** |
| --- |

5.6.3.x1 Enumeration: NetLocAccessSupport

Table 5.6.3.x1-1: Enumeration NetLocAccessSupport

| Enumeration value | Description | Applicability |
| --- | --- | --- |
| ANR_NOT_SUPPORTED | Indicates that the access network does not support the report of access network information. | |
| TZR_NOT_SUPPORTED | Indicates that the access network does not support the report of UE time zone.<br>(NOTE) | |
| NOTE: The UE time zone is not available in EPC untrusted WLAN. | | |

| *** 4th Change *** |
| --- |

A.2 Npcf_SMPolicyControl API

```
openapi: 3.0.0
info:
  title: Npcf_SMPolicyControl API
  version: 1.0.4
  description: |
    Session Management Policy Control Service
    © 2019, 3GPP Organizational Partners (ARIB, ATIS, CCSA, ETSI, TSDSI, TTA, TTC).
    All rights reserved.
externalDocs:
  description: 3GPP TS 29.512 V15.6.0; 5G System; Session Management Policy Control Service.
  url: 'http://www.3gpp.org/ftp/Specs/archive/29_series/29.512/'
:
components:
:
  schemas:
    :
    UeCampingRep:
      type: object
      properties:
        accessType:
          $ref: 'TS29571_CommonData.yaml#/components/schemas/AccessType'
        ratType:
          $ref: 'TS29571_CommonData.yaml#/components/schemas/RatType'
        servNfId:
          $ref: '#/components/schemas/ServingNfIdentity'
        servingNetwork:
          $ref: 'TS29571_CommonData.yaml#/components/schemas/NetworkId'
        userLocationInfo:
          $ref: 'TS29571_CommonData.yaml#/components/schemas/UserLocation'
        ueTimeZone:
          $ref: 'TS29571_CommonData.yaml#/components/schemas/TimeZone'
        netLocAccSupp:
          $ref: '#/components/schemas/NetLocAccessSupport'
    :
    NetLocAccessSupport:
      anyOf:
      - type: string
        enum:
          - ANR_NOT_SUPPORTED
          - TZR_NOT_SUPPORTED
      - type: string
        description: >
          This string provides forward-compatibility with future
          extensions to the enumeration but is not used to encode
          content defined in the present version of this API.
      description: >
        Possible values are
        - ANR_NOT_SUPPORTED: Indicates that the access network does not support the report of
        access network information.
        - TZR_NOT_SUPPORTED: Indicates that the access network does not support the report of UE
        time zone.
```

Fig. 13F

* 5th Change *

B.3.2.0 General

When the UE establishes the PDN connection through the EPC network and the SMF+PGW-C receives the Create Session Request message as defined in 3GPP TS 29.274 [37], the SMF+PGW-C shall behave as defined in subclause 4.2.2.2 with the differences that the SMF+PGW-C shall include (if available) in SmPolicyContextData data structure:

- the IMSI of the user within the "supi" attribute;
- the MSISDN of the user within the "gpsi" attribute;
- APN within the "dnn" attribute;
- PDN Type within the "pduSessionType" attribute;
- IMEI-SV within the "pei" attribute;
- IP-CAN type within the "accessType" attribute;
- RAT type within the "ratType" attribute;

NOTE 1: See Annex B.3.2.2 for further information.

- subscribed APN-AMBR within "subsSessAmbr" attribute;
- subscribed Default EPS bearer QoS within "subsDefQos" attribute;

NOTE 2: subscribed APN-AMBR and the QCI within the subscribed default EPS bearer QoS are mapped to subscribed Session-AMBR and 5QI as defined in Annex B.3.6.1 respectively.

- user location information within the "userLocationInfo" attribute;

NOTE 3: See Annex B.3.2.1 for further information.

- the S-NSSAI determined by the SMF+PGW-C within the "sliceInfo" attribute; and
- the bearer usage required of the default bearer within the "qosFlowUsage" attribute.
- the UE time zone information within "ueTimeZone" attribute, if available;

NOTE x1: The UE time zone is not available in EPC untrusted WLAN.

Fig. 13G

* 6th Change *

B.3.6.x1 Request and Report of Access Network information

If the NetLoc feature as defined in subclause 5.8 is supported, the PCF may request the SMF+PGW-C to report the access network information as defined in subclause 4.2.6.5.4.

If the AN_INFO policy control request trigger is set, upon receiving the "lastReqRuleData" attribute with the "reqData" attribute with the value(s) MS_TIME_ZONE and/or USER_LOC_INFO and the "refPccRuleIds" attribute containing the PCC rule identifier(s) corresponding to the PCC rule(s) being installed, modified or removed:

- If the SMF+PGW-C determines that the access network does not support the access network information reporting based on the feature support, the SMF+PGW-C shall immediately inform the PCF by including the "netLocAccSupp" attribute set to "ANR_NOT_SUPPORTED" value in the "UeCampingRep" data structure returned in the "200 OK" response to the policy update notification request.

- Otherwise:

a) If the "reqData" attribute includes the MS_TIME_ZONE value and the SMF+PGW-C determines that the access network does not support the report of the UE time zone, the SMF+PGW-C shall immediately inform the PCF by including the "netLocAccSupp" attribute set to "TZR_NOT_SUPPORTED" value in the "UeCampingRep" data structure returned in the "200 OK" response to the policy update notification request.

b) If the "reqData" attribute includes:

1) the USER_LOC_INFO value; and/or 2) the MS_TIME_ZONE value and the SMF+PGW-C determines the access network supports the report of UE time zone, the SMF+PGW-C shall apply appropriate procedures to the EPC access network to obtain the requested access network information and shall behave as specified in subclause 4.2.4.9.

Fig. 13H

\*\*\*\*\*\*\*\*\*\* Start of First Change to 3GPP 29.512 \*\*\*\*\*\*\*\*\*\*

| \*\*\* 1st Change \*\*\* |
|---|

5.6.1 General

This subclause specifies the application data model supported by the API.

The Npcf_SMPolicyControl API allows the SMF to retrieve the session management related policy from the PCF as defined in 3GPP TS 23.503 [6].

Table 5.6.1-1 specifies the data types defined for the Npcf_SMPolicyControl service based interface protocol.

Table 5.6.1-1: Npcf_SMPolicyControl specific Data Types

| Data type | Section defined | Description | Applicability |
|---|---|---|---|
| 5GSmCause | 5.6.3.2 | Indicates the 5GSM cause code value. | RAN-NAS-Cause |
| AccNetChargingAddress | 5.6.2.35 | Identifies the address of the network node performing charging and used for charging applications. | |
| AccNetChId | 5.6.2.23 | Contains the access network charging identifier for the PCC rule(s) or whole PDU session. | |
| AccuUsageReport | 5.6.2.18 | Contains the accumulated usage report information. | UMC |
| AfSigProtocol | 5.6.3.10 | Indicates the protocol used for signalling between the UE and the AF | ProvAFsignalFlow |
| AppDetectionInfo | 5.6.2.22 | Contains the detected application's traffic information. | ADC |
| AuthorizedDefaultQos | 5.6.2.34 | Authorized Default QoS | |
| ChargingData | 5.6.2.11 | Contains charging related parameters. | |
| ChargingInformation | 5.6.2.17 | Contains the addresses of the charging functions. | |
| ConditionData | 5.6.2.9 | Contains conditions for applicability of a rule. | |
| CreditManagementStatus | 5.6.3.16 | Indicates the reason of the credit management session failure. | |
| ErrorReport | 5.6.2.36 | Contains the rule reports. | |
| FailureCause | 5.6.3.14 | Indicates the cause of the failure in a Partial Success Report. | |
| FailureCode | 5.6.3.9 | Indicates the reason of the PCC rule failure. | |
| FlowDescription | 5.6.3.2 | Defines a packet filter for an IP flow. | |
| FlowDirection | 5.6.3.3 | Indicates the direction of the service data flow. | |
| FlowDirectionRm | 5.6.3.15 | This data type is defined in the same way as the "FlowDirection" data type, but with the OpenAPI "nullable: true" property. | |
| FlowInformation | 5.6.2.14 | Contains the flow information. | |
| MeteringMethod | 5.6.3.5 | Indicates the metering method. | |
| MulticastAccessControl | 5.6.3.20 | Indicates whether the service data flow, corresponding to the service data flow template, is allowed or not allowed. | WWC |
| NetLocAccessSupport | 5.6.3.x1 | Indicates the access network support of the report of the requested access network information. | NetLoc |
| RequestedQosMonitoringParameter | 5.6.3.21 | Indicates the requested QoS monitoring parameters to be measured. | QosMonitoring |

(Continued in Fig. 14B)

Fig. 14A (Continued from Fig. 14A)

| | | | |
|---|---|---|---|
| PacketFilterContent | 5.6.3.2 | Defines a packet filter for an IP flow. | |
| PacketFilterInfo | 5.6.2.30 | Contains the information from a single packet filter sent from the SMF to the PCF. | |
| PartialSuccessReport | 5.6.2.33 | Includes the information reported by the SMF when some of the PCC rules are not successfully installed/activated. | |
| PccRule | 5.6.2.6 | Contains the PCC rule information. | |
| PduSessionRelCause | 5.6.3.24 | Contains the SMF PDU Session release cause. | PDUSessionRelCause |
| PolicyControlRequestTrigger | 5.6.3.6 | Contains the policy control request trigger(s). | |
| QosCharacteristics | 5.6.2.16 | Contains QoS characteristics for a non-standardized or non-configured 5QI. | |
| QosData | 5.6.2.8 | Contains the QoS parameters. | |
| QosFlowUsage | 5.6.3.13 | Indicates a QoS flow usage information. | |
| QosMonitoringData | 5.6.2.40 | Contains QoS monitoring related control information. | QosMonitoring |
| QosMonitoringReport | 5.6.2.42 | Contains QoS monitoring reporting information. | QosMonitoring |
| QosNotificationControlInfo | 5.6.2.32 | Contains the QoS Notification Control Information. | |
| RanNasRelCause | 5.6.2.28 | Contains the RAN/NAS release cause. | RAN-NAS-Cause |
| RedirectAddressType | 5.6.3.12 | Indicates the redirect address type. | |
| RedirectInformation | 5.6.2.13 | Contains the redirect information. | |
| ReportingFrequency | 5.6.3.22 | Indicates the frequency for the reporting | QosMonitoring |
| ReportingLevel | 5.6.3.4 | Indicates the reporting level. | |
| RequestedQos | 5.6.2.31 | Contains the QoS information requested by the UE | |
| RequestedQosMonitoringParameter | 5.6.3.21 | Indicates the requested QoS monitoring parameters to be measured. | QosMonitoring |
| RequestedRuleData | 5.6.2.24 | Contains rule data requested by the PCF to receive information associated with PCC rules. | |
| RequestedRuleDataType | 5.6.3.7 | Contains the type of rule data requested by the PCF. | |
| RequestedUsageData | 5.6.2.25 | Contains usage data requested by the PCF requesting usage reports for the corresponding usage monitoring data instances. | |
| RuleOperation | 5.6.3.11 | Indicates a UE initiated resource operation that causes a request for PCC rules. | |
| RuleReport | 5.6.2.27 | Reports the status of PCC. | |
| RuleStatus | 5.6.3.8 | Indicates the status of PCC or session rule. | |
| ServingNfIdentity | 5.6.2.38 | Contains the serving Network Function identity. | |
| SessionRule | 5.6.2.7 | Contains session level policy information. | |
| SessionRuleFailureCode | 5.6.3.17 | Indicates the reason of the session rule failure. | |
| SessionRuleReport | 5.6.2.37 | Reports the status of session rule. | |
| SmPolicyAssociationReleaseCause | 5.6.3.23 | Represents the cause why the PCF requests the termination of the SM policy association. | |
| SmPolicyControl | 5.6.2.2 | Contains the parameters to request the SM policies and the SM policies authorized by the PCF. | |
| SmPolicyContextData | 5.6.2.3 | Contains the parameters to create individual SM policy resource. | |
| SmPolicyDecision | 5.6.2.4 | Contains the SM policies authorized by the PCF. | |
| SmPolicyNotification | 5.6.2.5 | Contains the update of the SM policies | |
| SmPolicyDeleteData | 5.6.2.15 | Contains the parameters to be sent to the PCF when the individual SM policy is deleted. | |
| SmPolicyUpdateContextData | 5.6.2.19 | Contains the met policy control request trigger(s) and corresponding new value(s) or the error report of the policy enforcement. | |

(Continued in Fig. 14C)

Fig. 14B (Continued from Fig. 14B)

| | | | |
|---|---|---|---|
| SteeringFunctionality | 5.6.3.18 | Indicates functionality to support traffic steering, switching and splitting determined by the PCF. | ATSSS |
| SteeringMode | 5.6.2.39 | Contains the steering mode value and parameters determined by the PCF. | ATSSS |
| SteeringModeValue | 5.6.3.19 | Indicates the steering mode value determined by the PCF. | ATSSS |
| TerminationNotification | 5.6.2.21 | Termination Notification | |
| TrafficControlData | 5.6.2.10 | Contains parameters determining how flows associated with a PCCRule are treated (blocked, redirected, etc). | |
| TsnBridgeInfo | 5.6.2.41 | Contains parameters that describe and identify the TSN bridge. | TimeSensitive Networking |
| UeCampingRep | 5.6.2.26 | Contains the current applicable values corresponding to the policy control request triggers. | |
| UeInitiatedResourceRequest | 5.6.2.29 | Indicates a UE requests specific QoS handling for selected SDF. | |
| UpPathChgEvent | 5.6.2.20 | Contains the UP path change event subscription from the AF | TSC |
| UsageMonitoringData | 5.6.2.12 | Contains usage monitoring related control information. | UMC |

Table 5.6.1-2 specifies data types re-used by the Npcf_SMPolicyControl service based interface protocol from other specifications, including a reference to their respective specifications and when needed, a short description of their use within the Npcf_SMPolicyControl service based interface.

Table 5.6.1-2: Npcf_SMPolicyControl re-used Data Types

| Data type | Reference | Comments | Applicability |
|---|---|---|---|
| 5GMmCause | 3GPP TS 29.571 [11] | Contains the cause value of 5GMM protocol. | RAN-NAS-Cause |
| 5Qi | 3GPP TS 29.571 [11] | Unsigned integer representing a 5G QoS Identifier (see subclause 5.7.2.1 of 3GPP TS 23.501 [2]), within the range 0 to 255. | |
| 5QiPriorityLevel | 3GPP TS 29.571 [11] | Unsigned integer indicating the 5QI Priority Level (see subclauses 5.7.3.3 and 5.7.4 of 3GPP TS 23.501 [2]), within the range 1 to 127. Values are ordered in decreasing order of priority, i.e. with 1 as the highest priority and 127 as the lowest priority. | |
| 5QiPriorityLevelRm | 3GPP TS 29.571 [11] | This data type is defined in the same way as the "5QiPriorityLevel" data type, but with the OpenAPI "nullable: true" property. | |
| AccessType | 3GPP TS 29.571 [11] | The identification of the type of access network. | |
| Ambr | 3GPP TS 29.571 [11] | Session AMBR. | |
| AnGwAddress | 3GPP TS 29.514 [17] | Carries the control plane address of the access network gateway. (NOTE 1) | |
| ApplicationChargingId | 3GPP TS 29.571 [11] | Application provided charging identifier allowing correlation of charging information. | AF_Charging_Identifier |
| Arp | 3GPP TS 29.571 [11] | ARP. | |
| AverWindow | 3GPP TS 29.571 [11] | Averaging Window. | |

(Continued in Fig. 14D)

Fig. 14C (Continued from Fig. 14C)

| | | | |
|---|---|---|---|
| AverWindowRm | 3GPP TS 29.571 [11] | This data type is defined in the same way as the "AverWindow" data type, but with the OpenAPI "nullable: true" property. | |
| Bytes | 3GPP TS 29.571 [11] | String with format "byte". | TimeSensitive Networking |
| BitRate | 3GPP TS 29.571 [11] | String representing a bit rate that shall be formatted as follows:<br><br>pattern: "^\d+(\.\d+)?(bps\|Kbps\|Mbps\|Gbps\|Tbps)$"<br>Examples:<br>"125 Mbps", "0.125 Gbps", "125000 Kbps". | |
| BitRateRm | 3GPP TS 29.571 [11] | This data type is defined in the same way as the "BitRate" data type, but with the OpenAPI "nullable: true" property. | |
| ChargingId | 3GPP TS 29.571 [11] | Charging identifier allowing correlation of charging information. | |
| ContentVersion | 3GPP TS 29.514 [17] | Indicates the content version of a PCC rule. It uniquely identifies a version of the PCC rule as defined in subclause 4.2.6.2.14. | RuleVersioning |
| DateTime | 3GPP TS 29.571 [11] | String with format "date-time" as defined in OpenAPI Specification [10]. | |
| DateTimeRm | 3GPP TS 29.571 [11] | This data type is defined in the same way as the "DateTime" data type, but with the OpenAPI "nullable: true" property. | |
| DnaiChangeType | 3GPP TS 29.571 [11] | Describes the types of DNAI change. | |
| Dnn | 3GPP TS 29.571 [11] | The DNN the user is connected to. | |
| DurationSec | 3GPP TS 29.571 [11] | Identifies a period of time in units of seconds. | |
| DurationSecRm | 3GPP TS 29.571 [11] | This data type is defined in the same way as the "DurationSec" data type, but with the OpenAPI "nullable: true" property. | |
| EthFlowDescription | 3GPP TS 29.514 [17] | Defines a packet filter for an Ethernet flow. (NOTE 2) | |
| ExtMaxDataBurstVol | 3GPP TS 29.571 [11] | Maximum Data Burst Volume. | EMDBV |
| ExtMaxDataBurstVolRm | 3GPP TS 29.571 [11] | This data type is defined in the same way as the "ExtMaxDataBurstVol" data type, but with the OpenAPI "nullable: true" property. | EMDBV |
| FinalUnitAction | 3GPP TS 32.291 [19] | Indicates the action to be taken when the user's account cannot cover the service cost. | |
| FlowStatus | 3GPP TS 29.514 [17] | Describes whether the IP flow(s) are enabled or disabled. The value "REMOVED" is not applicable to Npcf_SMPolicyControl service. | |
| Gpsi | 3GPP TS 29.571 [11] | Identifies a GPSI. | |
| GroupId | 3GPP TS 29.571 [11] | Identifies a group of internal globally unique ID. | |
| Guami | 3GPP TS 29.571 [11] | Globally Unique AMF Identifier. | |
| IpIndex | 3GPP TS 29.519 [15] | Information that identifies which IP pool or external server is used to allocate the IP address. | |
| Ipv4Addr | 3GPP TS 29.571 [11] | Identifies an Ipv4 address. | |
| Ipv6Addr | 3GPP TS 29.571 [11] | Identifies an IPv6 address. | |
| Ipv6Prefix | 3GPP TS 29.571 [11] | The Ipv6 prefix allocated for the user. | |
| MacAddr48 | 3GPP TS 29.571 [11] | MAC Address. | |
| MaxDataBurstVol | 3GPP TS 29.571 [11] | Maximum Data Burst Volume. | |
| MaxDataBurstVolRm | 3GPP TS 29.571 [11] | This data type is defined in the same way as the "MaxDataBurstVol" data type, but with the OpenAPI "nullable: true" property. | |
| NfInstanceId | 3GPP TS 29.571 [11] | The NF instance identifier. | |
| NgApCause | 3GPP TS 29.571 [11] | Contains the cause value of NgAP protocol. | RAN-NAS-Cause |

| | | | |
|---|---|---|---|
| PacketDelBudget | 3GPP TS 29.571 [11] | Packet Delay Budget. | |
| PacketErrRate | 3GPP TS 29.571 [11] | Packet Error Rate. | |
| PacketLossRateRm | 3GPP TS 29.571 [11] | This data type is defined in the same way as the "PacketLossRate" data type, but with the OpenAPI "nullable: true" property. | |
| PduSessionId | 3GPP TS 29.571 [11] | The identification of the PDU session. | |
| PduSessionType | 3GPP TS 29.571 [11] | Indicate the type of a PDU session. | |
| Pei | 3GPP TS 29.571 [11] | The Identification of a Permanent Equipment. | |
| PlmnIdNid | 3GPP TS 29.571 [11] | The identification of the Network. PLMN Identity, and for SNPN NID. | |
| PolicyAssociationReleaseCause | 3GPP TS 29.507 [25] | The cause why the PCF requests the termination of the policy association. | |
| PresenceInfo | 3GPP TS 29.571 [11] | Contains the information which describes a Presence Reporting Area. | PRA |
| PresenceInfoRm | 3GPP TS 29.571 [11] | This data type is defined in the same way as the "PresenceInfo" data type, but with the OpenAPI "nullable: true" property. | |
| ProblemDetails | 3GPP TS 29.571 [11] | Contains a detailed information about an error. | |
| QosNotifType | 3GPP TS 29.514 [17] | Indicates whether the GBR targets for the indicated SDFs are "NOT_GUARANTEED" or "GUARANTEED" again. | |
| QosResourceType | 3GPP TS 29.571 [11] | Indicates whether the resource type is GBR, delay critical GBR, or non-GBR. | |
| RatingGroup | 3GPP TS 29.571 [11] | Identifier of a rating group. | |
| RatType | 3GPP TS 29.571 [11] | The identification of the RAT type. | |
| RouteToLocation | 3GPP TS 29.571 [11] | A traffic routes to applications location. | TSC |
| ServiceId | 3GPP TS 29.571 [11] | Identifier of a service. | |
| Snssai | 3GPP TS 29.571 [11] | Identifies the S-NSSAI. | |
| SubscribedDefaultQos | 3GPP TS 29.571 [11] | Subscribed Default QoS. | |
| Supi | 3GPP TS 29.571 [11] | The identification of the user (i.e. IMSI, NAI). | |
| SupportedFeatures | 3GPP TS 29.571 [11] | Used to negotiate the applicability of the optional features defined in table 5.8-1. | |
| TraceData | 3GPP TS 29.571 [11] | | |
| TimeZone | 3GPP TS 29.571 [11] | Contains the user time zone information. | |
| Uinteger | 3GPP TS 29.571 [11] | Unsigned Integer. | TimeSensitive Networking |
| Uri | 3GPP TS 29.571 [11] | URI. | |
| UserLocation | 3GPP TS 29.571 [11] | Contains the user location. | |
| Volume | 3GPP TS 29.122 [32] | Unsigned integer identifying a volume in units of bytes. | |
| VolumeRm | 3GPP TS 29.122 [32] | This data type is defined in the same way as the "VolumeRm" data type, but with the OpenAPI "nullable: true" property. | |
| NOTE 1: "AnGwAddr" data structure is only applicable to the 5GS and EPC/E-UTRAN interworking scenario as defined in Annex B. | | | |
| NOTE 2: In order to support a set of MAC addresses with a specific range in the traffic filter, feature MacAddressRange as specified in subclause 5.8 shall be supported. | | | |

Fig. 14E

* 2nd Change *

5.6.2.26 Type UeCampingRep

Table 5.6.2.26-1: Definition of type UeCampingRep

| Attribute name | Data type | P | Cardinality | Description | Applicability |
|---|---|---|---|---|---|
| accessType | AccessType | O | 0..1 | The Access Type where the served UE is camping. | |
| ratType | RatType | O | 0..1 | The RAT Type where the served UE is camping. | |
| servNfId | ServingNfIdentity | O | 0..1 | Contains the serving network function identity. | |
| servingNetwork | PlmnIdNid | O | 0..1 | The serving network where the served UE is camping. For an SNPN the NID together with the PLMN ID identifies the SNPN. | |
| userLocationInfo | UserLocation | O | 0..1 | The location of the served UE is camping. | |
| ueTimeZone | TimeZone | O | 0..1 | The time zone where the served UE is camping. | |
| netLocAccSupp | NetLocAccessSupport | O | 0..1 | Indicates the access network does not support the report of the requested access network information. The absence of this attribute indicates that the access network supports access network information reporting. | NetLoc |

* 3rd Change *

5.6.3.x1 Enumeration: NetLocAccessSupport

Table 5.6.3.x1-1: Enumeration NetLocAccessSupport

| Enumeration value | Description | Applicability |
|---|---|---|
| ANR_NOT_SUPPORTED | Indicates that the access network does not support the report of access network information. | |
| TZR_NOT_SUPPORTED | Indicates that the access network does not support the report of UE time zone. (NOTE) | |
| NOTE: The UE time zone is not available in EPC untrusted WLAN. | | |

Fig. 14F

| *** 4th Change *** |
|---|

A.2 Npcf_SMPolicyControl API

```
openapi: 3.0.0
info:
  title: Npcf_SMPolicyControl API
  version: 1.1.1.alpha-4
  description: |
    Session Management Policy Control Service
    © 2019, 3GPP Organizational Partners (ARIB, ATIS, CCSA, ETSI, TSDSI, TTA, TTC).
    All rights reserved.
externalDocs:
  description: 3GPP TS 29.512 V16.3.0; 5G System; Session Management Policy Control Service.
  url: 'http://www.3gpp.org/ftp/Specs/archive/29_series/29.512/'
:
    UeCampingRep:
      type: object
      properties:
        accessType:
          $ref: 'TS29571_CommonData.yaml#/components/schemas/AccessType'
        ratType:
          $ref: 'TS29571_CommonData.yaml#/components/schemas/RatType'
        servNfId:
          $ref: '#/components/schemas/ServingNfIdentity'
        servingNetwork:
          $ref: 'TS29571_CommonData.yaml#/components/schemas/PlmnIdNid'
        userLocationInfo:
          $ref: 'TS29571_CommonData.yaml#/components/schemas/UserLocation'
        ueTimeZone:
          $ref: 'TS29571_CommonData.yaml#/components/schemas/TimeZone'
        netLocAccSupp:
          $ref: '#/components/schemas/NetLocAccessSupport'
:

    NetLocAccessSupport:
      anyOf:
      - type: string
        enum:
          - ANR_NOT_SUPPORTED
          - TZR_NOT_SUPPORTED
      - type: string
        description: >
          This string provides forward-compatibility with future
          extensions to the enumeration but is not used to encode
          content defined in the present version of this API.
      description: >
        Possible values are
        - ANR_NOT_SUPPORTED: Indicates that the access network does not support the report of
access network information.
        - TZR_NOT_SUPPORTED: Indicates that the access network does not support the report of UE
time zone.

```

Fig. 14G

> * 5th Change *

B.3.2.0 General

When the UE establishes the PDN connection through the EPC network and the SMF+PGW-C receives the Create Session Request message as defined in 3GPP TS 29.274 [37], the SMF+PGW-C shall behave as defined in subclause 4.2.2.2 with the differences that the SMF+PGW-C shall include (if available) in SmPolicyContextData data structure:

- the IMSI of the user within the "supi" attribute;
- the MSISDN of the user within the "gpsi" attribute;
- APN within the "dnn" attribute;
- PDU Session Id determined by the SMF+PGW-C within "pduSessionId" attribute for a UE that has an EPS subscription that allows 5GC interworking but does not support 5GC NAS.

NOTE 1: For a PDN connection established via the MME or ePDG, the PDU Session ID value is assigned from a reserved range as specified in Table 5.4.2-1 of TS 29.571 [11];

- PDN Type within the "pduSessionType" attribute;
- IMEI-SV within the "pei" attribute;
- IP-CAN type within the "accessType" attribute;
- RAT type within the "ratType" attribute;

NOTE 2: See Annex B.3.2.2 for further information.

- subscribed APN-AMBR within "subsSessAmbr" attribute;
- subscribed Default EPS bearer QoS within "subsDefQos" attribute;

NOTE 3: Subscribed APN-AMBR and the QCI within the subscribed default EPS bearer QoS are mapped to subscribed Session-AMBR and 5QI as defined in Annex B.3.6.1 respectively.

- user location information within the "userLocationInfo" attribute;

NOTE 4: See Annex B.3.2.1 for further information.

- the S-NSSAI determined by the SMF+PGW-C within the "sliceInfo" attribute; and
- the bearer usage required of the default bearer within the "qosFlowUsage" attribute.
- the UE time zone information within "ueTimeZone" attribute, if available;

NOTE x1: The UE time zone is not available in EPC untrusted WLAN.

Fig. 14H

* 6th Change *

B.3.6.x1 Request and Report of Access Network information

If the NetLoc feature as defined in subclause 5.8 is supported, the PCF may request the SMF+PGW-C to report the access network information as defined in subclause 4.2.6.5.4.

If the AN_INFO policy control request trigger is set, upon receiving the "lastReqRuleData" attribute with the "reqData" attribute with the value(s) MS_TIME_ZONE and/or USER_LOC_INFO and the "refPccRuleIds" attribute containing the PCC rule identifier(s) corresponding to the PCC rule(s) being installed, modified or removed:

- If the SMF+PGW-C determines that the access network does not support the access network information reporting based on the feature support, the SMF+PGW-C shall immediately inform the PCF by including the "netLocAccSupp" attribute set to "ANR_NOT_SUPPORTED" value in the "UeCampingRep" data structure returned in the "200 OK" response to the policy update notification request.

- Otherwise:

a) If the "reqData" attribute includes the MS_TIME_ZONE value and the SMF+PGW-C determines that the access network does not support the report of the UE time zone, the SMF+PGW-C shall immediately inform the PCF by including the "netLocAccSupp" attribute set to "TZR_NOT_SUPPORTED" value in the "UeCampingRep" data structure returned in the "200 OK" response to the policy update notification request.

b) If the "reqData" attribute includes:

1) the USER_LOC_INFO value; and/or 2) the MS_TIME_ZONE value and the SMF+PGW-C determines the access network supports the report of UE time zone, the SMF+PGW-C shall apply appropriate procedures to the EPC access network to obtain the requested access network information and shall behave as specified in subclause 4.2.4.9.

Fig. 14I

******** Start of First Change to 3GPP 29.514 ********

| *** 1st Change *** |
|---|

4.2.2.14 Request of access network information

This procedure is used by an AF to request the PCF to report the access network information (i.e., user location and/or user timezone information) at the creation of the "Individual Application Session Context" resource, when the "NetLoc" feature is supported.

The AF shall include in the HTTP POST request message described in subclause 4.2.2.2:

- an entry of the "AfEventSubscription" data type in the "events" attribute with:

a) the "event" attribute set to the value "ANI_REPORT"; and b) the "notifMethod" attribute set to the value "ONE_TIME"; and

- the "reqAni" attribute, with the required access network information, i.e. user location and/or user time zone information).

When the PCF determines that the access network does not support the access network information reporting because the SMF does not support the NetLoc feature, the PCF shall respond to the AF including in the "EventsNotification" data type the "netLocAccSupp" attribute set to "ANR_NOT_SUPPORTED" value. Otherwise, the PCF shall immediately configure the SMF to provide such access information, as specified in 3GPP TS 29.512 [8].

The PCF shall reply to the AF with an HTTP response message as described in subclause 4.2.2.2.

Fig. 15A

> * 2nd Change *

4.2.3.14 Request of access network information

This procedure is used by an AF to request access network information for an existing "Individual Application Session Context" resource at service information modification when the "NetLoc" feature is supported.

> NOTE 1: Subclause 4.2.6.6 describes the AF request of access network information without providing service information.

The AF shall create event subscription information by including in the "AppSessionContextUpdateData" data type the "evSubsc" attribute of "EventsSubscReqData" data type with the corresponding list of events to subscribe to. The AF shall include in the HTTP PATCH request message described in subclause 4.2.3.2:

- an entry of the "AfEventSubscription" data type in the "events" attribute with:

a) the "event" attribute set to the value "ANI_REPORT"; and b) the "notifMethod" attribute set to the value "ONE_TIME"; and

- the "reqAni" attribute, with the required access network information, i.e. user location and/or user time zone information).

When the PCF determines that the access network does not support the access network information reporting because the SMF does not support the NetLoc feature, the PCF shall respond to the AF including in the "EventsNotification" data type the "netLocAccSupp" attribute set to "ANR_NOT_SUPPORTED" value. Otherwise, the PCF shall immediately configure the SMF to provide such access information, as specified in 3GPP TS 29.512 [8].

The PCF shall reply to the AF with an HTTP response message as described in subclause 4.2.3.2.

> NOTE 2: The AF does not invoke the Npcf_PolicyAuthorization_Update service operation to remove subscription to access network information report since the "Access Network Information Notification" is the one-time reported event. Once the access network information is reported to the AF the subscription to the access network information report is automatically terminated in the PCF and the related information is removed.

Fig. 15B

| *** 3rd Change *** |
|---|

4.2.4.6 Request and report of access network information

This procedure is used by an AF to request the PCF to report the access network information (i.e., user location and/or user timezone information) at the deletion of the "Individual Application Session Context" resource when the "NetLoc" feature is supported.

This procedure is initiated when:

- the "Individual Application Session Context" is deleted by the AF; or

- the PCF requests the deletion of the "Individual Application Session Context" from the AF, as described in subclause 4.2.5.3, due to PDU session termination or the termination of all the service data flows of the AF session.

The AF shall include in the HTTP POST request message described in subclause 4.2.4.2:

- an entry of the "AfEventSubscription" data type in the "events" attribute with:

a) the "event" attribute set to the value "ANI_REPORT"; and b) the "notifMethod" attribute set to the value "ONE_TIME"; and

- the "reqAni" attribute, with the required access network information, i.e. user location and/or user time zone information).

When the PCF determines that the access network does not support the access network information reporting because the SMF does not support the NetLoc feature, the PCF shall respond to the AF including in the "EventsNotification" data type the "netLocAccSupp" attribute set to "ANR_NOT_SUPPORTED" value. Otherwise, the PCF shall immediately configure the SMF to provide such access information, as specified in 3GPP TS 29.512 [8].

When the PCF receives the access network information from the SMF, the PCF shall provide the corresponding access network information to the AF by including the "EventsNotification" data type in the "200 OK" response to the HTTP POST request. The PCF shall include:

- in case of 3GPP access, the user location information in the "eutraLocation" or in the "nrLocation" attribute in the "ueLoc" attribute, if available and required;

- in case of untrusted non-3GPP access, the user location information in the "n3gaLocation" attribute in the "ueLoc" attribute, if required, as follows:

a) the user local IP address in the "ueIpv4Addr" or "ueIpv6Addr" attribute, if available;

b) the UDP source port in the "portNumber" attribute if available; and (Continued in Fig. 15D)

Fig. 15C (Continued from Fig. 15C)

c) the TCP source port in the "portNumber" attribute if available;

- in case of trusted non-3GPP access, the user location information in the "n3gaLocation" attribute in the "ueLoc" attribute, if required, as follows:

a) the user local IP address in the "ueIpv4Addr" or "ueIpv6Addr" attribute, if available;

b) the UDP source port in the "portNumber" attribute if available;

c) the TCP source port in the "portNumber" attribute if available; and d) the TNAP identifier, that shall consist of:

i. the SSID in the "ssId" attribute;

ii. the BSSID the "bssId" attribute if available; and iii. the TNAP civic address in the "tnapCivicAddress" attribute if available;

- the serving PLMN network code and country code in the "plmnId" attribute, if user location information is required but not available in any access;

- the UE time zone in the "ueTimeZone" attribute if required and available; and/or

- the "netLocAccSupp" attribute set to "TZR_NOT_SUPPORTED" value, if UE time zone information is required but not available in current access.

When the PCF receives from the SMF that the access network does not support access network information report, the PCF shall include the "netLocAccSupp" attribute set to "ANR_NOT_SUPPORTED" value in the "EventsNotification" data type in the "200 OK" response to the HTTP POST request.

The PCF shall also include an event of the "AfEventNotification" data type in the "evNotifs" attribute with the "event" attribute set to the value "ANI_REPORT".

Fig. 15D

* 4th Change *

4.2.5.11 Reporting access network information

This procedure is used by the PCF to report the access network information (i.e., user location and/or user timezone information) to the AF when the "NetLoc" feature is supported.

When the PCF receives the access network information from the SMF, the PCF shall include the "EventsNotification" data type in the body of the HTTP POST request message sent to the AF as described in subclause 4.2.5.2. The PCF shall include in the "EventsNotification" data type:

- in case of 3GPP access, the user location information in the "eutraLocation" or in the "nrLocation" attribute in the "ueLoc" attribute, if available and required;

- in case of untrusted non-3GPP access, the user location information in the "n3gaLocation" attribute in the "ueLoc" attribute, if required, as follows:

a) the user local IP address in the "ueIpv4Addr" or "ueIpv6Addr" attribute, if available;

b) the UDP source port in the "portNumber" attribute if available; and c) the TCP source port in the "portNumber" attribute if available;

- in case of trusted non-3GPP access, the user location information in the "n3gaLocation" attribute in the "ueLoc" attribute, if required, as follows:

a) the user local IP address in the "ueIpv4Addr" or "ueIpv6Addr" attribute, if available;

b) the UDP source port in the "portNumber" attribute if available;

c) the TCP source port in the "portNumber" attribute if available; and d) the TNAP identifier, that shall consist of:

i. the SSID in the "ssId" attribute;

ii. the BSSID the "bssId" attribute if available; and iii. the TNAP civic address in the "tnapCivicAddress" attribute if available;

- the serving PLMN network code and country code in the "plmnId" attribute, if user location information is required but not available in any access;

- the UE timezone in the "ueTimeZone" attribute if required and available; and/or

- the "netLocAccSupp" attribute set to "TZR_NOT_SUPPORTED" value, if UE time zone information is required but not available in current access.

When the PCF receives from the SMF that the access network does not support access network information report, the PCF shall include the "netLocAccSupp" attribute set to "ANR_NOT_SUPPORTED" value in the "EventsNotification" data type in the body of the HTTP POST request message sent to the AF as described in subclause 4.2.5.2.

(Continued in Fig. 15F)

Fig. 15E (Continued from Fig. 15E)

The PCF shall also include an event of the "AfEventNotification" data type in the "evNotifs" attribute with the "event" attribute set to the value "ANI_REPORT".

NOTE: The PCF receives the access network information from the SMF if it is previously requested by the AF or at PDU session termination or at the termination of all the service data flows of the AF session.

The PCF shall not invoke the Npcf_PolicyAuthorization_Notify service operation with the "event" attribute set to the value "ANI_REPORT" to report to the AF any subsequently received access network information, unless the AF sends a new request for access network information.

* 5th Change *

4.2.6.6 Request of access network information

This procedure is used by an AF to request the PCF to report the access network information (i.e., user location and/or user timezone information) without providing service information when the "NetLoc" feature is supported.

The AF can request access network information without providing service information:

- at initial subscription to events, using the HTTP POST request message as described in subclause 4.2.6.3; and
- at modification of the subscription to events, using the HTTP PUT request message as described in subclause 4.2.6.2.

The AF shall include in the HTTP request message:

- an entry of the "AfEventSubscription" data type in the "events" attribute with:

a) the "event" attribute set to the value "ANI_REPORT"; and b) the "notifMethod" attribute set to the value "ONE_TIME"; and

- the "reqAni" attribute, with the required access network information, i.e. user location and/or user time zone information).

When the PCF determines that the access network does not support the access network information reporting because the SMF does not support the NetLoc feature, the PCF shall respond to the AF including in the "EventsNotification" data type the "netLocAccSupp" attribute set to "ANR_NOT_SUPPORTED" value. Otherwise, the PCF shall immediately configure the SMF to provide such access information, as specified in 3GPP TS 29.512 [8].

The PCF shall reply to the AF with the HTTP POST response as described in subclause 4.2.6.3 and with the HTTP PUT response as described in subclause 4.2.6.2.

Fig. 15F

* 6th Change *

5.6.1 General

This subclause specifies the application data model supported by the API.

Table 5.6.1-1 specifies the data types defined for the Npcf_PolicyAuthorization service based interface protocol.

Table 5.6.1-1: Npcf_PolicyAuthorization specific Data Types

| Data type | Section defined | Description | Applicability |
|---|---|---|---|
| AcceptableServiceInfo | 5.6.2.30 | Acceptable maximum requested bandwidth. | |
| AccessNetChargingIdentifier | 5.6.2.32 | Contains the access network charging identifier. | IMS_SBI |
| AfEvent | 5.6.3.7 | Represents an event to notify to the AF. | |
| AfEventNotification | 5.6.2.11 | Represents the notification of an event. | |
| AfEventSubscription | 5.6.2.10 | Represents the subscription to events. | |
| AfNotifMethod | 5.6.3.8 | Represents the notification methods that can be subscribed for an event. | |
| AfRequestedData | 5.6.3.18 | Represents the information the AF requested to be exposed. | IMS_SBI |
| AfRoutingRequirement | 5.6.2.13 | Describes the routing requirements for the application traffic flows. | InfluenceOnTrafficRouting |
| AfRoutingRequirementRm | 5.6.2.24 | This data type is defined in the same way as the "AfRoutingRequirement" data type, but with the OpenAPI "nullable: true" property. | InfluenceOnTrafficRouting |
| AnGwAddress | 5.6.2.20 | Carries the control plane address of the access network gateway. | |
| AppSessionContext | 5.6.2.2 | Represents an Individual Application Session Context resource. | |
| AppSessionContextReqData | 5.6.2.3 | Represents the Individual Application Session Context resource data received in an HTTP POST request message. | |
| AppSessionContextRespData | 5.6.2.4 | Represents the Individual Application Session Context resource data produced by the server and returned in an HTTP response message. | |
| AppSessionContextUpdateData | 5.6.2.5 | Describes the modifications to an Individual Application Session Context resource. | |
| ContentVersion | 5.6.3.2 | Represents the version of a media component. | MediaComponentVersioning |
| EthFlowDescription | 5.6.2.17 | Defines a packet filter for an Ethernet flow. | |
| EventsNotification | 5.6.2.9 | Describes the notification about the events occurred within an Individual Application Session Context resource. | |
| EventsSubscReqData | 5.6.2.6 | Identifies the events the application subscribes to within an Individual Application Session Context resource. | |
| EventsSubscReqDataRm | 5.6.2.6.25 | This data type is defined in the same way as the "EventsSubscReqData" data type, but with the OpenAPI "nullable: true" property. | |
| ExtendedProblemDetails | 5.6.2.29 | Data type that extends ProblemDetails. | |
| FlowDescription | 5.6.3.2 | Defines a packet filter for an IP flow. | |

(Continued in Fig. 15H)

Fig. 15G (Continued from Fig. 15G)

| | | | |
|---|---|---|---|
| Flows | 5.6.2.21 | Identifies the flows related to a media component. | |
| FlowStatus | 5.6.3.12 | Describes whether the IP flow(s) are enabled or disabled. | |
| FlowUsage | 5.6.3.14 | Describes the flow usage of the flows described by a media subcomponent. | |
| MediaComponent | 5.6.2.7 | Contains service information for a media component of an AF session. | |
| MediaComponentRm | 5.6.2.6.26 | This data type is defined in the same way as the "MediaComponent" data type, but with the OpenAPI "nullable: true" property. | |
| MediaComponentResourcesStatus | 5.6.3.13 | Indicates whether the media component is active or inactive. | |
| MediaSubComponent | 5.6.2.8 | Contains the requested bitrate and filters for the set of IP flows identified by their common flow identifier. | |
| MediaSubComponentRm | 5.6.2.27 | This data type is defined in the same way as the "MediaSubComponent" data type, but with the OpenAPI "nullable: true" property. | |
| OutOfCreditInformation | 5.6.2.33 | Indicates the service data flows without available credit and the corresponding termination action. | IMS_SBI |
| PcscfRestorationRequestData | 5.6.2.36 | Indicates P-CSCF restoration. | PCSCF-Restoration-Enhancement |
| PreemptionControlInformation | 5.6.3.19 | Pre-emption control information. | MCPTT-Preemption |
| PreemptionControlInformationRm | 5.6.3.21 | This data type is defined in the same way as the "PreemptionControlInformation" data type, but with the OpenAPI "nullable: true" property. | MCPTT-Preemption |
| PrioritySharingIndicator | 5.6.3.20 | Priority sharing indicator. | PrioritySharing |
| QosMonitoringInformation | 5.6.2.34 | QoS monitoring for UL, DL or round trip delay. | QoSMonitoring |
| QosNotificationControlInfo | 5.6.2.15 | Indicates whether the QoS targets related to certain media component are not guaranteed or are guaranteed again. | |
| QosNotifType | 5.6.3.9 | Indicates type of notification for QoS Notification Control. | |
| RequiredAccessInfo | 5.6.3.15 | Indicates the access network information required for an AF session. | NetLoc |
| ResourcesAllocationInfo | 5.6.2.14 | Indicates the status of the PCC rule(s) related to certain media component. | |
| ServAuthInfo | 5.6.3.5 | Indicates the result of the Policy Authorization service request from the AF. | |
| ServiceInfoStatus | 5.6.3.16 | Preliminary or final service information status. | IMS_SBI |
| ServiceUrn | 5.6.3.2 | Service URN. | IMS_SBI |
| SipForkingIndication | 5.6.3.17 | Describes if several SIP dialogues are related to an "Individual Application Session Context" resource. | IMS_SBI |
| SpatialValidity | 5.6.2.16 | Describes the spatial validity of an AF request for influencing traffic routing. | InfluenceOnTrafficRouting |
| SpatialValidityRm | 5.6.2.28 | This data type is defined in the same way as the "SpatialValidity" data type, but with the OpenAPI "nullable: true" property. | InfluenceOnTrafficRouting |
| SponId | 5.6.3.2 | Contains an Identity of a sponsor. | SponsoredConnectivity |
| SponsoringStatus | 5.6.3.6 | Represents whether sponsored data connectivity is enabled or disabled/not enabled. | SponsoredConnectivity |

(Continued in Fig. 15I)

Fig. 15H (Continued from Fig. 15H)

| | | | |
|---|---|---|---|
| TemporalValidity | 5.6.2.22 | Indicates the time interval during which the AF request is to be applied. | InfluenceOnTrafficRouting |
| TerminationCause | 5.6.3.10 | Indicates the cause for requesting the deletion of the Individual Application Session Context resource. | |
| TerminationInfo | 5.6.2.12 | Includes information related to the termination of the Individual Application Session Context resource. | |
| TosTrafficClass | 5.6.3.2 | Contains the IPv4 Type-of-Service or the IPv6 Traffic-Class field and the ToS/Traffic Class mask field. | |
| TosTrafficClassRm | 5.6.3.2 | This data type is defined in the same way as the "TosTrafficClass" data type, but with the OpenAPI "nullable: true" property. | |
| TsnQoSContainer | 5.6.2.35 | TSN QoS parameters. | TimeSensitiveNetworking |
| UeIdentityInfo | 5.6.2.31 | Represents 5GS-Level UE Identities. | IMS_SBI |

Table 5.6.1-2 specifies data types re-used by the Npcf_PolicyAuthorization service based interface protocol from other specifications, including a reference to their respective specifications and when needed, a short description of their use within the Npcf_PolicyAuthorization service based interface.

Table 5.6.1-2: Npcf_PolicyAuthorization re-used Data Types

| Data type | Reference | Comments | Applicability |
|---|---|---|---|
| AccNetChargingAddress | 3GPP TS 29.512 [8] | Indicates the IP address of the network entity within the access network performing charging. | IMS_SBI |
| AccessType | 3GPP TS 29.571 [12] | The identification of the type of access network. | |
| AccumulatedUsage | 3GPP TS 29.122 [15] | Accumulated Usage. | SponsoredConnectivity |
| AfSigProtocol | 3GPP TS 29.512 [8] | Represents the protocol used for signalling between the UE and the AF. | ProvAFsignalFlow |
| ApplicationChargingId | 3GPP TS 29.571 [12] | Application provided charging identifier allowing correlation of charging information. | IMS_SBI |
| BdtReferenceId | 3GPP TS 29.122 [15] | Identifies transfer policies. | |
| BitRate | 3GPP TS 29.571 [12] | Specifies bitrate in kbits per second. | |
| BitRateRm | 3GPP TS 29.571 [12] | This data type is defined in the same way as the "BitRate" data type, but with the OpenAPI "nullable: true" property. | |
| Bytes | 3GPP TS 29.571 [12] | String with format "byte". | TimeSensitiveNetworking |
| ChargingId | 3GPP TS 29.571 [12] | Charging identifier allowing correlation of charging information. | IMS_SBI |
| DateTime | 3GPP TS 29.571 [12] | String with format "date-time" as defined in OpenAPI Specification [11]. | InfluenceOnTrafficRouting |
| Dnai | 3GPP TS 29.571 [12] | Data network access identifier. | InfluenceOnTrafficRouting |
| Dnn | 3GPP TS 29.571 [12] | Data Network Name. | |
| FinalUnitAction | 3GPP TS 32.291 [22] | Indicates the action to be taken when the user's account cannot cover the service cost. | |

(Continued in Fig. 15J)

Fig. 15I (Continued from Fig. 15I)

| | | | |
|---|---|---|---|
| FlowDirection | 3GPP TS 29.512 [8] | Flow Direction. | |
| Gpsi | 3GPP TS 29.571 [12] | Identifies the GPSI. | |
| Ipv4Addr | 3GPP TS 29.571 [12] | Identifies an IPv4 address. | |
| Ipv6Addr | 3GPP TS 29.571 [12] | Identifies an IPv6 address. | |
| MacAddr48 | 3GPP TS 29.571 [12] | MAC Address. | |
| NetLocAccessSupport | 3GPP TS 29.512 [8] | Indicates the access network support of the report of the requested access network information. | NetLoc |
| PacketLossRateRm | 3GPP TS 29.571 [12] | This data type is defined in the same way as the "PacketLossRate" data type, but with the OpenAPI "nullable: true" property. | CHEM |
| Pei | 3GPP TS 29.571 [12] | Identifies the PEI. | IMS_SBI |
| PlmnId | 3GPP TS 29.571 [12] | PLMN mobile country code and mobile network code. | |
| PreemptionCapability | 3GPP TS 29.571 [12] | Pre-emption capability. | MCPTT-Preemption |
| PreemptionVulnerability | 3GPP TS 29.571 [12] | Pre-emption vulnerability. | MCPTT-Preemption |
| PreemptionCapabilityRm | 3GPP TS 29.571 [12] | It is defined in the same way as the "PreemptionCapability" data type, but with the OpenAPI "nullable: true" property. | MCPTT-Preemption |
| PreemptionVulnerabilityRm | 3GPP TS 29.571 [12] | It is defined in the same way as the "PreemptionVulnerability" data type, but with the OpenAPI "nullable: true" property. | MCPTT-Preemption |
| PresenceInfo | 3GPP TS 29.571 [12] | Represents an area of interest, e.g. a Presence Reporting Area. | InfluenceOnTrafficRouting |
| RanNasRelCause | 3GPP TS 29.512 [8] | Indicates RAN and/or NAS release cause code information. | RAN-NAS-Cause |
| RatType | 3GPP TS 29.571 [12] | RAT Type. | |
| Snssai | 3GPP TS 29.571 [12] | Identifies the S-NSSAI. | |
| Supi | 3GPP TS 29.571 [12] | Identifies the SUPI. | |
| SupportedFeatures | 3GPP TS 29.571 [12] | Used to negotiate the applicability of the optional features defined in table 5.8-1. | |
| TimeZone | 3GPP TS 29.571 [12] | Time Zone. | NetLoc |
| TsnBridgeInfo | 3GPP TS 29.512 [8] | TSN bridge information. | TimeSensitiveNetworking |
| Uinteger | 3GPP TS 29.571 [12] | Unsigned Integer, i.e. only value 0 and integers above 0 are permissible. In an OpenAPI Specification [11] schema, the format shall be designated as "Uinteger". | |
| Uint32 | 3GPP TS 29.571 [12] | Unsigned 32-bit integers, i.e. only value 0 and 32-bit integers above 0 are permissible. | ResourceSharing |
| Uint32Rm | 3GPP TS 29.571 [12] | This data type is defined in the same way as the "Uint32" data type, but with the OpenAPI "nullable: true" property. | ResourceSharing |
| UpPathChgEvent | 3GPP TS 29.512 [8] | Contains the subscription information to be delivered to SMF for the UP path management events. | InfluenceOnTrafficRouting |
| Uri | 3GPP TS 29.571 [12] | String providing an URI. | |
| UsageThreshold | 3GPP TS 29.122 [15] | Usage Thresholds. | SponsoredConnectivity |
| UsageThresholdRm | 3GPP TS 29.122 [15] | This data type is defined in the same way as the "UsageThreshold" data type, but with the OpenAPI "nullable: true" property. | SponsoredConnectivity |
| UserLocation | 3GPP TS 29.571 [12] | User Location. | NetLoc |

Fig. 15J

* 7th Change *

5.6.2.9 Type EventsNotification

Table 5.6.2.9-1: Definition of type EventsNotification

| Attribute name | Data type | P | Cardinality | Description | Applicability |
|---|---|---|---|---|---|
| accessType | AccessType | C | 0..1 | Includes the access type. It shall be present when the notified event is "ACCESS_TYPE_CHG". | |
| anChargAddr | AccNetChargingAddress | O | 0..1 | Includes the access network charging address. It shall be present if available when the notified event is "CHARGING_CORRELATION". | IMS_SBI |
| anChargIds | array(AccessNetChargingIdentifier) | C | 1..N | Includes the access network charging identifier(s). It shall be present when the notified event is "CHARGING_CORRELATION". | IMS_SBI |
| anGwAddr | AnGwAddress | O | 0..1 | Access network Gateway Address. It shall be present, if applicable, when the notified event is "ACCESS_TYPE_CHG". | |
| evSubsUri | Uri | M | 1 | The Events Subscription URI. Identifies the Events Subscription sub-resource that triggered the notification. | |
| evNotifs | array(AfEventNotification) | M | 1..N | Notifications about individual events. | |
| failedResourcAllocReports | array(ResourcesAllocationInfo) | C | 1..N | Indicates the status of the PCC rule(s) related to certain failed media components. It shall be included when the event trigger is "FAILED_RESOURCES_ALLOCATION". | |
| netLocAccSupp | NetLocAccessSupport | O | 0..1 | Indicates the access network does not support the report of the requested access network information.<br><br>The absence of this attribute indicates that the access network supports access network information reporting. | NetLoc |
| outOfCredReports | array(OutOfCreditInformation) | C | 1..N | Out of credit information per service data flow. It shall be present when the notified event is "OUT_OF_CREDIT". | IMS_SBI |
| plmnId | PlmnId | C | 0..1 | PLMN Identifier. It shall be present when the notified event is "PLMN_CHG" or, if location information is required but is not available when the notified event is "ANI_REPORT". It shall be present if available when the notified event is "RAN_NAS_CAUSE". | |
| qncReports | array(QosNotificationControlInfo) | C | 1..N | QoS notification control information. It shall be present when the notified event is "QOS_NOTIF". | |
| ranNasRelCauses | array(RanNasRelCause) | C | 1..N | RAN-NAS release cause. It shall be present if available when the notified event is "RAN_NAS_CAUSE". | RAN-NAS-Cause |
| ratType | RatType | O | 0..1 | RAT type. It shall be present, if applicable, when the notified event is "ACCESS_TYPE_CHG". | |

(Continued in Fig. 15L)

(Continued from Fig. 15K)

| | | | | | |
|---|---|---|---|---|---|
| ueLoc | UserLocation | O | 0..1 | E-UTRA, NR, or non-3GPP trusted and untrusted access user location information. "n3gppTai" and "n3Iwfld" attributes within the "N3gaLocation" data type shall not be supplied. It shall be present if required and available when the notified event is "ANI_REPORT". It shall be present if available when the notified event is "RAN_NAS_CAUSE". | NetLoc, RAN-NAS-Cause |
| ueTimeZone | TimeZone | O | 0..1 | UE time zone. It shall be present if required and available when the notified event is "ANI_REPORT". It shall be present if available when the notified event is "RAN_NAS_CAUSE". | NetLoc, RAN-NAS-Cause |
| usgRep | AccumulatedUsage | C | 0..1 | Indicates the measured volume and/or time for sponsored data connectivity. It shall be present when the notified event is "USAGE_REPORT". | SponsoredConnectivity |
| tsnBridgeInfo | TsnBridgeInfo | O | 0..1 | Reports the TSN bridge information. | TimeSensitive Networking |
| tsnPortManContDstt | Bytes | O | 0..1 | Transports TSN port management information encoded as specified in subclause 9.11.4.27 of 3GPP TS 24.501 [49] starting with octet 2. | TimeSensitive Networking |
| tsnPortManContNwtt | Bytes | O | 0..1 | Transports TSN port management information encoded as specified in subclause 9.11.4.27 of 3GPP TS 24.501 [49] starting with octet 2. | TimeSensitive Networking |

* 8th Change *

A.2  Npcf_PolicyAuthorization API

```
openapi: 3.0.0
info:
  title: Npcf_PolicyAuthorization Service API
  version: 1.1.0.alpha-4
  description: |
    PCF Policy Authorization Service.
    © 2019, 3GPP Organizational Partners (ARIB, ATIS, CCSA, ETSI, TSDSI, TTA, TTC).
    All rights reserved.

externalDocs:
  description: 3GPP TS 29.514 V16.3.0; 5G System; Policy Authorization Service;Stage 3.
  url: 'http://www.3gpp.org/ftp/Specs/archive/29_series/29.514/'

:
    EventsNotification:
      description: describes the notification of a matched event
      type: object
      required:
        - evSubsUri
        - evNotifs
      properties:
        accessType:
          $ref: 'TS29571_CommonData.yaml#/components/schemas/AccessType'
        anChargAddr:
          $ref: 'TS29512_Npcf_SMPolicyControl.yaml#/components/schemas/AccNetChargingAddress'
```

(Continued in Fig. 15M)

Fig. 15L (Continued from Fig. 15L)

```
        anChargIds:
          type: array
          items:
            $ref: '#/components/schemas/AccessNetChargingIdentifier'
          minItems: 1
        anGwAddr:
          $ref: '#/components/schemas/AnGwAddress'
        evSubsUri:
          $ref: 'TS29571_CommonData.yaml#/components/schemas/Uri'
        evNotifs:
          type: array
          items:
            $ref: '#/components/schemas/AfEventNotification'
          minItems: 1
        failedResourcAllocReports:
          type: array
          items:
            $ref: '#/components/schemas/ResourcesAllocationInfo'
          minItems: 1
        netLocAccSupp:
          $ref: 'TS29512_Npcf_SMPolicyControl.yaml#/components/schemas/NetLocAccessSupport'
        outOfCredReports:
          type: array
          items:
            $ref: '#/components/schemas/OutOfCreditInformation'
          minItems: 1
        plmnId:
          $ref: 'TS29571_CommonData.yaml#/components/schemas/PlmnId'
        qncReports:
          type: array
          items:
            $ref: '#/components/schemas/QosNotificationControlInfo'
          minItems: 1
        ranNasRelCauses:
          type: array
          items:
            $ref: 'TS29512_Npcf_SMPolicyControl.yaml#/components/schemas/RanNasRelCause'
          minItems: 1
          description: Contains the RAN and/or NAS release cause.
        ratType:
          $ref: 'TS29571_CommonData.yaml#/components/schemas/RatType'
        ueLoc:
          $ref: 'TS29571_CommonData.yaml#/components/schemas/UserLocation'
        ueTimeZone:
          $ref: 'TS29571_CommonData.yaml#/components/schemas/TimeZone'
        usgRep:
          $ref: 'TS29122_CommonData.yaml#/components/schemas/AccumulatedUsage'
```

* End of Changes *

PARTIAL SUPPORT OF ACCESS NETWORK INFORMATION

RELATED APPLICATIONS

This application claims the benefit of U.S. provisional patent application Ser. No. 62/977,635, filed Feb. 17, 2020, the disclosure of which is hereby incorporated herein by reference in its entirety.

TECHNICAL FIELD

The present disclosure relates to provision of access network information to a requester in a network.

BACKGROUND

Signalling Flows for IMS, Request of NetLoc Information by the P-CSCF

Third Generation Partnership Project (3GPP) has developed NetLoc, which is a feature to make the Network Provided Location Information (NPLI) related to the access network that the user equipment (UE) is camped on available to the internet protocol (IP) multimedia system (IMS) nodes whenever the IMS operator needs to record this information (e.g., to fulfil legal obligations such as a regulation requiring logging call information together with UE Location), for charging purposes or because of other application specific requirements.

Clause 1 describes an example of an application request of network provided location information (there are other IMS/SDP (session description protocol) interactions where the P-CSCF (proxy-call session control function) requests NPLI). Clause 2 describes how the policy control function (PCF) then requests NPLI to the session management function (SMF) (or SMF+PGW (Packet data network (PDN) GateWay). Clauses 2 and 3 describe how the PCF gets the NPLI from the access network. Relevant text for these procedures is set forth below.

Clause 1: Provisioning of Service Information at Originating P-CSCF and PCF

FIG. 1 illustrates conventional policy and charging control (PCC) Procedures for IMS Session Establishment at an originating P-CSCF and a PCF. In FIG. 1, the P-CSCF derives the provisioning of service information to the PCF from the SDP offer/answer exchange. FIG. 1 illustrates the following steps:

Step 100. The P-CSCF receives the SDP parameters defined by the originator within an SDP offer in session initiation protocol (SIP) signalling.

Step 102. The P-CSCF identifies and defines the (downlink) connection information needed (IP address of the downlink IP flow(s), port numbers to be used, etc.).

Step 104. The P-CSCF forwards the SDP offer in SIP signalling.

Step 106. The P-CSCF gets the negotiated SDP parameters from the terminating side through an SIP signalling interaction within an SDP answer.

Step 108. The P-CSCF identifies the (uplink) connection information needed (IP address of the uplink media IP flow(s), port numbers to be used, etc.).

Step 110. The P-CSCF invokes or requests the Npcf_PolicyAuthorization_Create service operation to forward the derived session information to the PCF by sending an HTTP POST request to the "Application Sessions" resource.

Step 112. (Rx case) The P-CSCF provides session information to the PCF by sending a Diameter authentication and authorization request (AAR) for a new Rx Diameter session.

In these steps (110, 112), the P-CSCF may also request the report of network provided location information (NPLI).

Step 114. The PCF stores application session information and performs session binding and/or identifies a protocol data unit (PDU) session. For an N5 interface, the PCF creates an "Individual Application Session Context" resource to store the received application session information.

Step 116. The PCF replies to the P-CSCF with an HTTP "201 Created" (e.g., Npcf_PolicyAuthorization_Create) response and includes the uniform resource identifier (URI) of the "Individual Application Session Context" resource in the Location header field.

Step 118. (Rx case) The PCF sends a Diameter authentication, authorization, and accounting (AAA) to the P-CSCF.

Step 120. Upon reception of the acknowledgement from the PCF, the SDP parameters are passed to the UE in SIP signalling.

Step 122. The PCF executes interactions according to FIG. 2. This step implies provisioning of PCC rules and is executed in parallel with steps 124 and 126 (steps 128 and 130 for Rx case). The provisioning of PCC rules, if requested by the P-CSCF in step 110 (step 112 for Rx case), shall include the request of reporting network provided location information (NPLI).

Step 124. If the P-CSCF requested access network information in step 110, the PCF invokes the Npcf_PolicyAuthorization_Notify service operation to forward the access network information received in step 122 in an HTTP POST request sent to the Notification URI received in step 110.

Step 126. If step 124 occurs, the P-CSCF acknowledges the receipt of the notification request with an HTTP "204 No Content" (e.g., Npcf_PolicyAuthorization_Notify) response to the PCF.

Step 128. (Rx case) If the P-CSCF requested access network information in step 112, the PCF forwards the access network information received in step 122 in a Diameter re-authorization request (RAR).

Step 130. (Rx case) If step 128 occurs, the P-CSCF acknowledges the receipt of the Diameter RAR through a Diameter Re-authorization Acknowledgment (RAA).

Step 132. If step 124 occurs (step 128 for Rx case), the P-CSCF forwards the access network information as the NPLI when a suitable SIP message is received.

Clause 2: Provisioning of PCC Rules in the SMF (or SMF+PGW)

FIG. 2 illustrates conventional interactions between a PCF and a SMF for PCF-initiated session management (SM) Policy Association Modification procedures. This procedure is performed when the PCF decides to modify the PDU session (updating PCC rules) due to the P-CSCF provisioning of service information.

Step 200. The PCF receives a P-CSCF request to provision service information, as described in FIG. 1, step 110 (step 112 for Rx case), that triggers the re-evaluation of the PCC rule information to install in the SMF (or SMF+PGW).

Step 202. The PCF binds the P-CSCF request with an SM Policy Context (a PDU Session), and determines that a network initiated PDU session modification procedure is required. New PCC rules, requesting the report of access network information (NPLI), are installed in the SMF.

Step 204. The PCF invokes the Npcf_SMPolicyControl_UpdateNotify service operation by sending the HTTP POST request with "{Notification URI}/update" as the resource URI to the SMF that has previously subscribed. The request operation provides the PDU session identification (ID) and the updated PCC rules, as described in subclause 4.2.3 of 3GPP TS 29.512.

Step 206. The SMF sends an HTTP "200 OK" (e.g., an Npcf_SMPolicyControl_UpdateNotify Response) to the PCF to acknowledge the installation of the PCC rules. The SMF initiates the PDU session modification procedures towards the access and mobility management function (AMF) (or the S-GW/ePDG in case the UE is connected to a 4G Access network). As part of this PDU session modification request, the SMF requests NPLI.

Step 208. When the SMF receives the available NPLI (UE Location and/or UE Time Zone), the SMF reports it to the PCF invoking the Npcf_SMPolicyControl_Update service operation by sending the HTTP POST request with request URI for the Individual SM Policy Context resource URI and an HTTP body including the UE Location and/or UE Time Zone as described in subclause 4.2.4.9 of 3GPP TS 29.512.

Step 210. The PCF sends to the SMF an HTTP "200 OK" (e.g., an Npcf_SMPolicyControl_UpdateResponse) to acknowledge the report and continues with step 124 of FIG. 1.

Clause 3: Access Network Information Reporting in 5G Network

To support charging data collection and to fulfill regulatory requirements (e.g., to provide NPLI as defined in TS 23.228 [15]) related with the set-up, modification, and release of IMS Voice calls or with SMS transfer the following applies for the cases where the UE is accessing via a 5G Network:

When an AMF forwards uplink (UL) non-access stratum (NAS) or N2 signalling to a peer network function (NF) (e.g., to an SMF or to a short message service function (SMSF)) or during the UP connection activation of a PDU Session, the AMF provides any User Location Information it has received from the 5G-access network (AN) as well as the Access Type (3GPP-Non 3GPP) of the AN over which it has received the UL NAS or N2 signalling. The AMF also provides the corresponding UE Time Zone. In addition, to fulfill regulatory requirements (e.g., providing NPLI, as defined in TS 23.228 [15]) when the access is non-3GPP, the AMF may also provide the last known 3GPP access User Location Information with its age, if the UE is still attached to the same AMF for 3GPP access (i.e., valid User Location Information).

The User Location Information, the access type and the UE Time Zone may be further provided by the SMF to the PCF if the PCF has requested so (see clause 1 and clause 2 above). The PCF may get this information from the SMF to provide NPLI to applications (such as IP multimedia subsystem (IMS)) that have requested it.

SUMMARY

Embodiments of a method performed by a Session Management Function (SMF) for providing Access Network (AN) information are disclosed. The method comprises receiving a request for AN information from a Policy Control Function (PCF). The method also comprises determining whether an AN does not support reporting of the requested AN information. The method also comprises, upon determining that the AN does not support reporting of the requested AN information, sending, to the PCF, a notification that the AN does not support reporting of the requested AN information. The method also comprises, upon determining that the AN does support reporting of the requested AN information, acquiring the requested AN information and sending the requested AN information to the PCF.

In one embodiment, sending the notification that the AN does not support the reporting of the requested AN information comprises sending a UeCampingRep data structure. In one embodiment, sending the notification that the AN does not support the reporting of the requested AN information comprises sending a UeCampingRep data structure having a netLocAccSupp attribute set to an ANR_NOT_SUPPORTED value. In one embodiment, the requested AN information comprises User Equipment (UE) location information or timezone information, and sending the notification that the AN does not support the reporting of the requested AN information comprises sending a UeCampingRep data structure having a netLocAccSupp attribute set to a TZR_NOT_SUPPORTED value.

Embodiments of a method performed by a PCF for providing AN information are also disclosed. The method comprises receiving a request for AN information from an Application Function (AF). The method also comprises forwarding the request to an SMF. The method also comprises receiving, from the SMF, a response to the request. The method also comprises forwarding the response to the AF.

In one embodiment, the response from the SMF comprises an indication that an AN does not support reporting the requested AN information. In one embodiment, the response from the SMF comprises a UeCampingRep data structure. In one embodiment, the UeCampingRep data structure comprises a netLocAccSupp attribute set to an ANR_NOT_SUPPORTED value. In one embodiment, the requested AN information comprises UE location information or timezone information and the UeCampingRep data structure comprises a netLocAccSupp attribute set to a TZR_NOT_SUPPORTED value.

Embodiments of a method performed by an AF for requesting AN information are disclosed. The method comprises sending a request for AN information to a PCF. The method also comprises receiving, from the PCF, a response to the request for AN information. The response includes the requested AN information or includes an indication that an AN does not support reporting the requested AN information.

In one embodiment, the response from the PCF comprises a UeCampingRep data structure. In one embodiment, the UeCampingRep data structure comprises a netLocAccSupp attribute set to an ANR_NOT_SUPPORTED value. In one embodiment, the requested AN information comprises UE location information or timezone information and the UeCampingRep data structure comprises a netLocAccSupp attribute set to a TZR_NOT_SUPPORTED value.

Embodiments of an SMF are also disclosed. The SMF is adapted to receive a request for AN information from a PCF. The SMF is also adapted to determine whether an AN does not support reporting of the requested AN information. The SMF is adapted to, upon determining that the AN does not support reporting of the requested AN information, send, to the PCF, a notification that the AN does not support reporting of the requested AN information. The SMF is also adapted to, upon determining that the AN does support reporting of the requested AN information, acquire the requested AN information, and send the requested AN information to the PCF. In one embodiment, the SMF is further adapted to perform any of the embodiments of the method performed by an SMF for providing AN information.

Embodiments of a PCF are also disclosed. The PCF is adapted to receive, from an AF, a request for AN information. The PCF is also adapted to forward the request to an SMF. The PCF is also adapted to receive, from the SMF, a response to the request. The PCF is also adapted to forward the response to the AF. In one embodiment, the PCF is further adapted to perform any of the embodiments of the method performed by a PCF for providing AN information.

Embodiment of an AF are also disclosed. The AF is adapted to send, to a PCF, a request for AN information. The AF is also adapted to received, from the PCF, a response to the request for AN information. The response includes the requested AN information or includes an indication that an AN does not support reporting of the requested AN information. In one embodiment, the AF is further adapted to perform any of the embodiments of the method performed by an AF for requesting AN information.

Embodiments of a network node for implementing an SMF are also disclosed. The network node comprises processing circuitry. The processing circuitry is configured to cause the network node to receive, from a PCF, a request for AN information. The processing circuitry is also configured to cause the network node to determine whether an AN does not support reporting of the requested AN information. The processing circuitry is also configured to cause the network node to, upon determining that the AN does not support reporting of the requested AN information, send, to the PCF, a notification that the AN does not support reporting of the requested AN information. The processing circuitry is also configured to cause the network node to, upon determining that the AN does support reporting of the requested AN information, acquire the requested AN information, and send the requested AN information to the PCF.

In one embodiment, the processing circuitry configured to send the notification that the AN does not support the reporting of the requested AN information is further configured to send a UeCampingRep data structure. In one embodiment, the processing circuitry configured to send the notification that the AN does not support the reporting of the requested AN information is further configured to send a UeCampingRep data structure having a netLocAccSupp attribute set to an ANR_NOT_SUPPORTED value. In one embodiment, the requested AN information comprises UE location information or timezone information, and the processing circuitry configured to send the notification that the AN does not support the reporting of the requested AN information is further configured to send a UeCampingRep data structure having a netLocAccSupp attribute set to a TZR_NOT_SUPPORTED value.

Embodiments of a network node for implementing a PCF are also disclosed. The PCF comprises processing circuitry. The processing circuitry is configured to cause the network node to receive, from an AF, a request for AN information. The processing circuitry is also configured to cause the network node to forward the request to an SMF. The processing circuitry is also configured to cause the network node to receive, from the SMF, a response to the request. The processing circuitry is also configured to cause the network node to forward the response to the AF.

In one embodiment, the response from the SMF comprises an indication that an AN does not support reporting the requested AN information. In one embodiment, the response from the SMF comprises a UeCampingRep data structure. In one embodiment, the UeCampingRep data structure comprises a netLocAccSupp attribute set to an ANR_NOT_SUPPORTED value. In one embodiment, the requested AN information comprises UE location information or timezone information and the UeCampingRep data structure comprises a netLocAccSupp attribute set to a TZR_NOT_SUPPORTED value.

Embodiments of a network node for implementing an AF are also disclosed. The AF comprises processing circuitry. The processing circuitry is configured to cause the network node to send, to a PCF, a request for AN information. The processing circuitry is also configured to cause the network node to receive, from the PCF, a response to the request for AN information. The response includes the requested AN information or includes an indication that an AN does not support reporting the requested AN information.

In one embodiment, the response from the PCF comprises a UeCampingRep data structure. In one embodiment, the UeCampingRep data structure comprises a netLocAccSupp attribute set to an ANR_NOT_SUPPORTED value. In one embodiment, the requested AN information comprises UE location information or timezone information and the UeCampingRep data structure comprises a netLocAccSupp attribute set to a TZR_NOT_SUPPORTED value.

Embodiments of a method performed in a cellular communication system are also disclosed. The method comprises, at an SMF for providing AN information, receiving, from a PCF, a request for AN information. The method also comprises determining whether an AN does not support reporting of the requested AN information. The method also comprises, upon determining that the AN does not support reporting of the requested AN information, sending, to the PCF, a response comprising a notification that the AN does not support reporting of the requested AN information. The method also comprises, upon determining that the AN does support reporting of the requested AN information, acquiring the requested AN information, and sending the requested AN information to the PCF. The method also comprises, at the PCF, receiving, from an AF, the request for AN information. The method also comprises forwarding the request to the SMF. The method also comprises receiving, from the SMF, the response to the request. The method also comprises forwarding the response to the AF. The method also comprises, at the AF, sending, to the PCF, the request for AN information. The method also comprises receiving, from the PCF, the response to the request for AN information. The response includes the requested AN information or includes an indication that an AN does not support reporting the requested AN information.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13A-13H illustrate changes to 3GPP TS 29.512 V15.6.0 according to some embodiments of the present disclosure;

FIGS. 14A-14I illustrate changes to 3GPP TS 29.512 V16.3.0 according to some embodiments of the present disclosure; and FIGS. 15A-15M illustrate changes to 3GPP TS 29.514 V16.3.0 according to some embodiments of the present disclosure.

DETAILED DESCRIPTION

Figure 1:
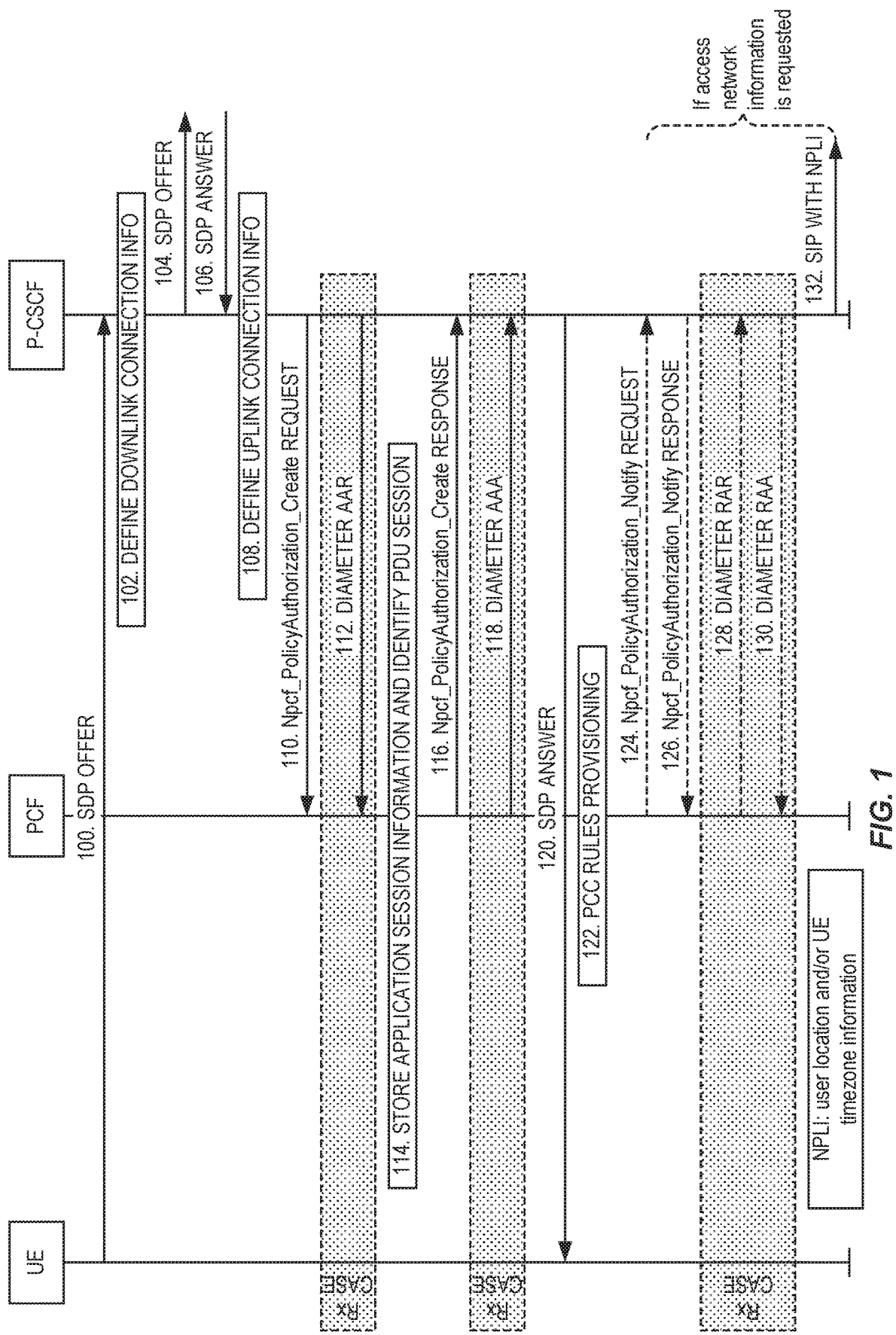
FIG. 1 illustrates conventional policy and charging control (PCC) Procedures for IMS Session Establishment at an originating P-CSCF and a PCF.
Figure 2:
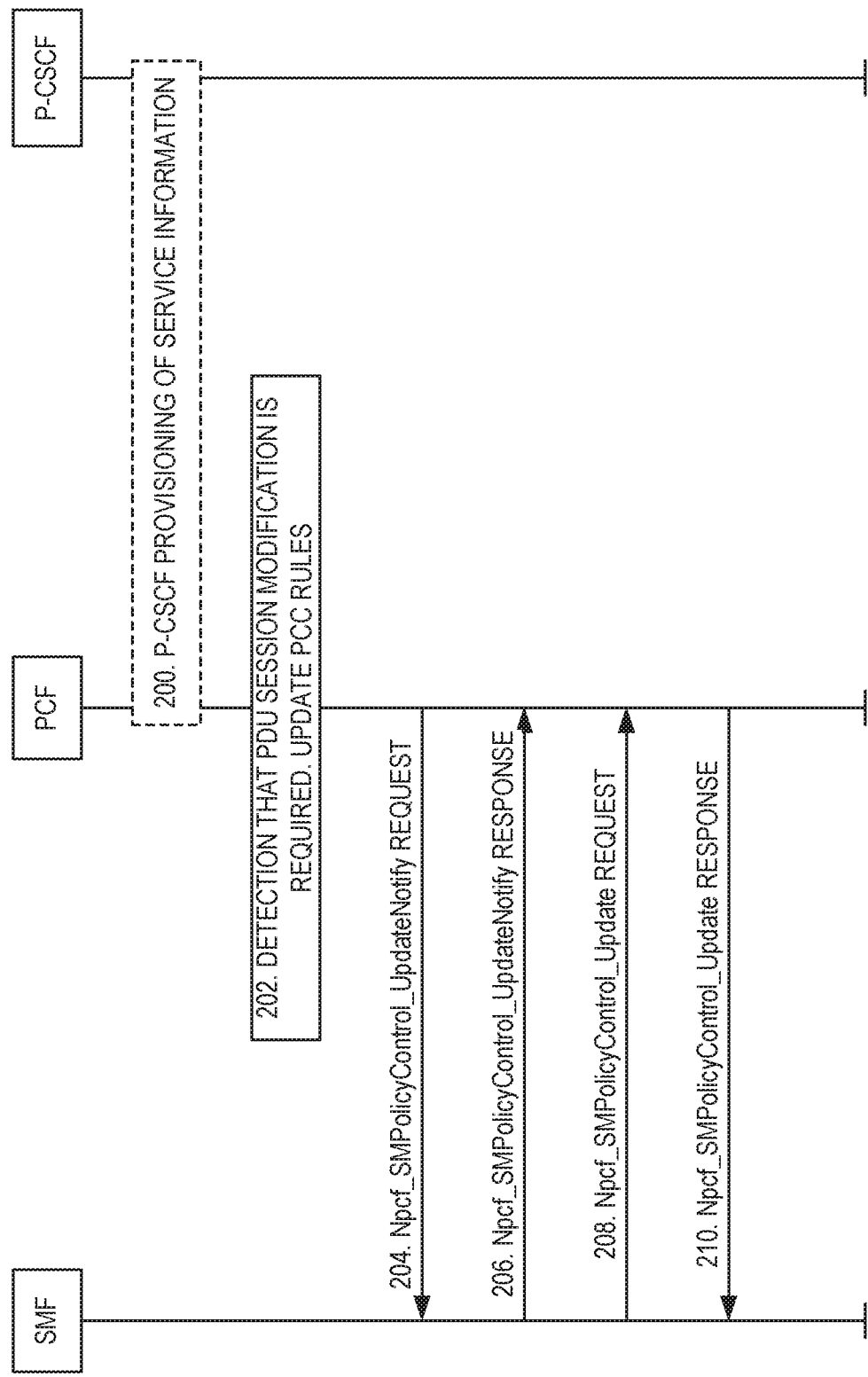
FIG. 2 illustrates conventional interactions between a PCF and a SMF for PCF-initiated session management (SM) Policy Association Modification procedures.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Management Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) when an application function (AF) requests network information. According to current procedures, whenever the AF needs network provided location information (NPLI) for specific reasons, the AF subscribes to be informed about NPLI: either location information or time zone, or both, depending on the purpose. Additionally, the AF may subscribe to receive information about radio access type (RAT) type/Access Type changes in the policy control function (PCF), if this information is relevant for the AF to request this specific information.

As the functionality is defined today, it is possible that not all the access information is available in the access network. That is:

For Untrusted wireless local area networks (WLANs), the time zone is not available Any access network could not provide the information for privacy reasons, network policies, impossibility of derivation, etc. If the information refers to the location information, according to current procedures, the serving public land mobile network (PLMN) network code and country code will be provided instead. However, nothing is provided when it refers to the time zone.

When the NetLoc feature is not supported by the session management function (SMF) or the PCF, the AF receives information that the Access Report is not supported.

With this state of the art the following limitations exist:

For access networks where the time zone is not available, the AF will not be notified when the time zone changes or that the access network does not support the reporting. Thus, it can make wrong assumptions and may consider that the time zone has not changed even if it changed.

For access networks where the time zone is not available, it is not specified what the SMF will do when the time zone is not provided by the access network and it was requested by the AF. It means unexpected behavior will occur in the network.

Even if the AF subscribes to access type changes simultaneously with the request of access information (or in advance), the AF will not know if the non-3GPP network is trusted or untrusted or if the network is private. The AF could derive the kind of access network if the AF got the location (whose encoding depends on the kind of 3GPP/non-3GPP trusted/untrusted) but it will mean extra logic in the AF and the mandatory subscription to location information.

The SMF/PCF informs about the lack of support of NetLoc functionality, but the AF will not be informed if the access network can provide the information and if it can be provided only partially.

Certain aspects of the present disclosure and their embodiments may provide solutions to the aforementioned or other challenges. The present disclosure proposes a solution with the following functionality: when the Access Network does not support part of the information required by the AF (e.g., time zone), the SMF will indicate to the PCF that this specific information is not supported and the PCF will indicate so to the AF. As such, the present disclosure provides the following:

A mechanism to allow the AF to get clear information about the availability of all or partial requested access information.

When the SMF cannot get part of the requested information (time zone), the SMF will notify the PCF that this information is not provided because the network does not support it.

When the PCF gets information that part of the requested information (time zone) is not supported, the PCF will inform the AF about this lack of support There are, proposed herein, various embodiments which address one or more of the issues disclosed herein. Certain embodiments may provide one or more of the following technical advantage(s):

The AF gets clear information on whether all or partial requested information was available or not and the reason why it was not provided.

Whenever the AF subscribes to time zone reporting, the AF will get information of the time zone or, if not supported by the access network or not available, about the lack of support.

The AF will not have to assume that the lack of reporting means that the requested information is not supported, i.e., the SMF will be able to report information about the lack of support of partial information when the AF subscribes to receive only time zone information and the network does not support it.

The AF will not have to interpret that the absence of time zone in the access network reporting means that it was not provided because it was not supported by the access network.

The AF will not have to subscribe to access type changes and to always require the location information in combination with the time zone (even if the location was not needed) to derive that the absence of time zone means that the access network does not support it.

Figure 3:
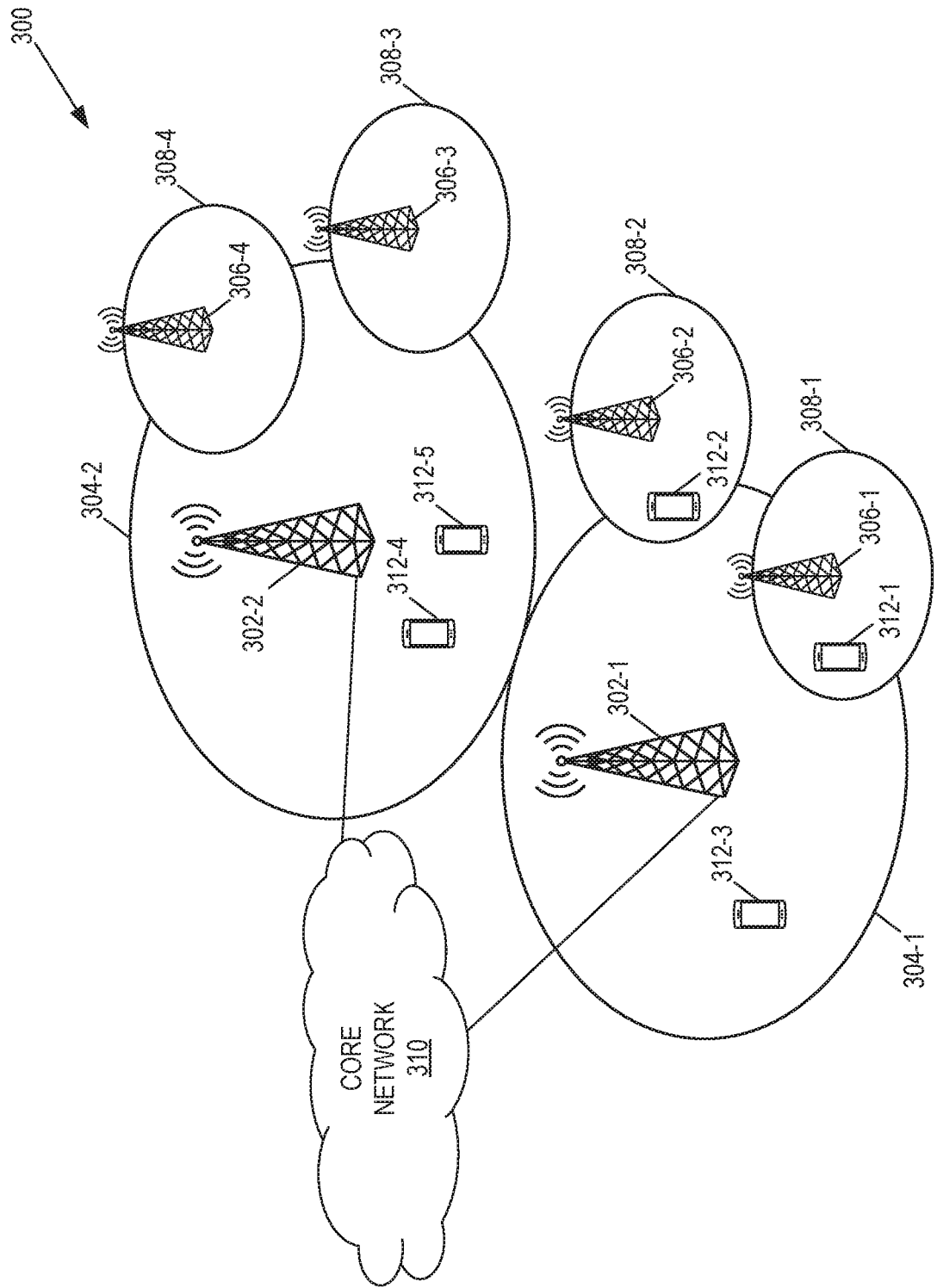
FIG. 3 illustrates one example of a cellular communication network according to some embodiments of the present disclosure.

Before addressing particular embodiments of the present disclosure, a general overview of a cellular communications system is provided with reference to FIG. 3. In this regard, FIG. 3 illustrates one example of a cellular communications system 300 in which embodiments of the present disclosure may be implemented. In the embodiments described herein, the cellular communications system 300 is a 5G system (5GS) including a new radio (NR) radio access node (RAN) (NR RAN) or long term evolution (LTE) RAN (i.e., E-UTRA RAN) or an Evolved Packet System (EPS) including an LTE RAN. In this example, the RAN includes base stations 302-1 and 302-2, which in LTE are referred to as enhanced node Bs (eNBs) (when connected to an evolved packet core (EPC)) and in 5G NR are referred to as gNBs (e.g., LTE RAN nodes connected to 5GC, which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Figure 4:
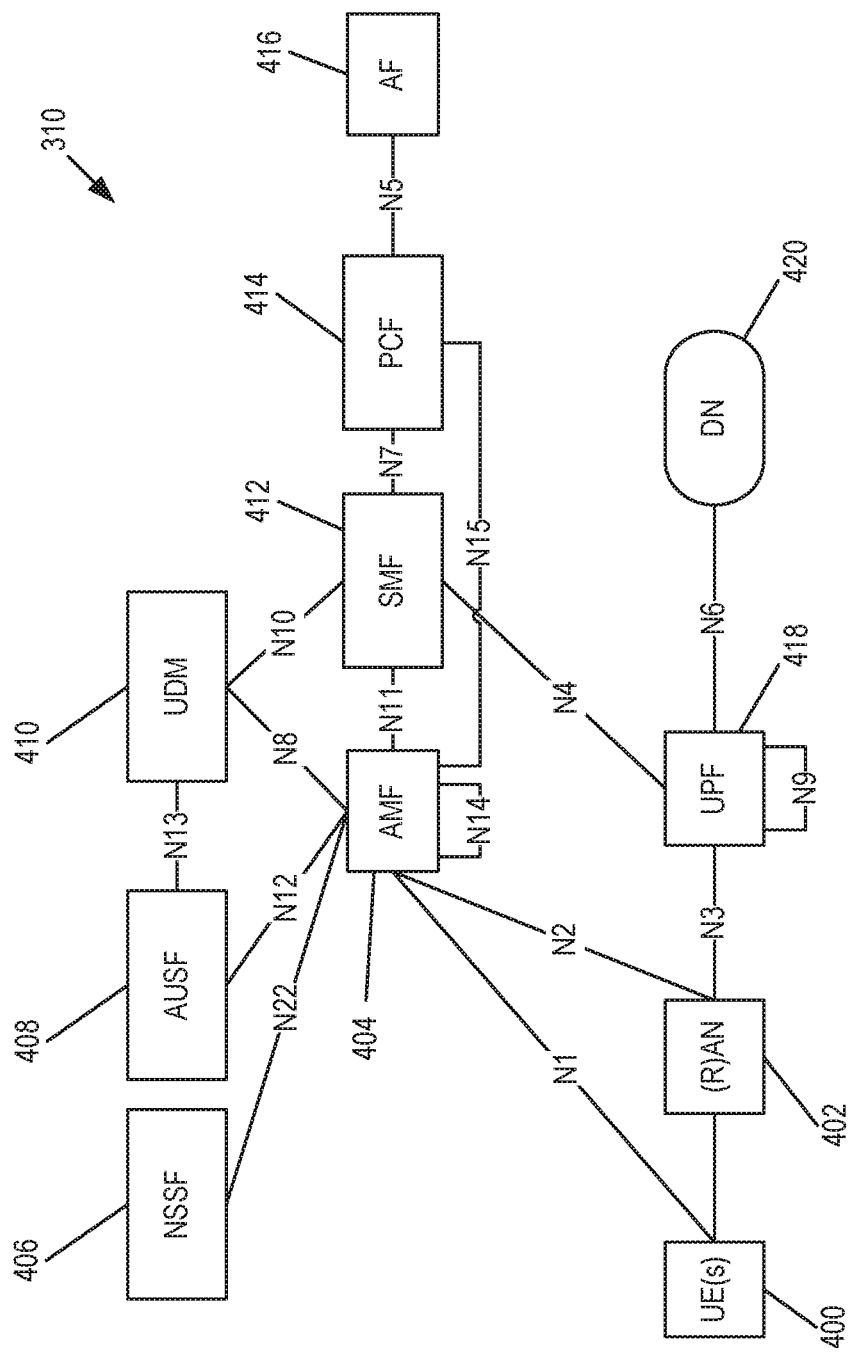
FIG. 4 illustrates a wireless communication system represented as a 5G network architecture composed of core Network Functions (NFs)

FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the core network 310 of the system 300 of FIG. 3.

Seen from the access side, the 5G network architecture shown in FIG. 4 comprises a plurality of UEs 400 connected to either a RAN or an Access Network (AN) 402 as well as an AMF 404. Typically, the (R)AN 402 comprises base stations, e.g., such as evolved Node Bs (eNBs) or NR base stations (gNBs) or similar. Seen from the core network side, the 5G core NFs shown in FIG. 4 include a Network Slice Selection Function (NSSF) 406, an Authentication Server Function (AUSF) 408, a Unified Data Management (UDM) 410, the AMF 404, a Session Management Function (SMF) 412, a Policy Control Function (PCF) 414, and an Application Function (AF) 416.

Reference point representations of the 5G network architecture are used to develop detailed call flows in the normative standardization. The N1 reference point is defined to carry signaling between the UE 400 and AMF 404. The reference points for connecting between the AN 402 and AMF 404 and between the AN 402 and user plane function (UPF) 418 are defined as N2 and N3, respectively. There is a reference point, N11, between the AMF 404 and SMF 412, which implies that the SMF 412 is at least partly controlled by the AMF 404. N4 is used by the SMF 412 and UPF 418 so that the UPF 418 can be set using the control signal generated by the SMF 412, and the UPF 418 can report its state to the SMF 412. N9 is the reference point for the connection between different UPFs 418, and N14 is the reference point connecting between different AMFs 404, respectively. N15 and N7 are defined since the PCF 414 applies policy to the AMF 404 and SMF 412, respectively. N12 is required for the AMF 404 to perform authentication of the UE 400. N8 and N10 are defined because the subscription data of the UE 400 is required for the AMF 404 and SMF 412. N6 is defined between the UPF 418 and a data network (DN) 420.

The 5G core network aims at separating the user plane and the control plane. The user plane carries user traffic while the control plane carries signaling in the network. In FIG. 4, the UPF 418 is in the user plane and all other NFs, i.e., the AMF 404, SMF 412, PCF 414, AF 416, AUSF 408, and UDM 410, are in the control plane. Separating the user and control planes guarantees each plane resource is scaled independently. It also allows UPFs 418 to be deployed separately from control plane functions in a distributed fashion. In this architecture, UPFs 418 may be deployed very close to UEs 400 to shorten the Round Trip Time (RTT) between UEs and the data network for some applications requiring low latency.

The core 5G network architecture is composed of modularized functions. For example, the AMF 404 and SMF 412 are independent functions in the control plane. Separated AMF 404 and SMF 412 allow independent evolution and scaling. Other control plane functions like the PCF 414 and AUSF 408 can be separated as shown in FIG. 4. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs 418.

Figure 5:
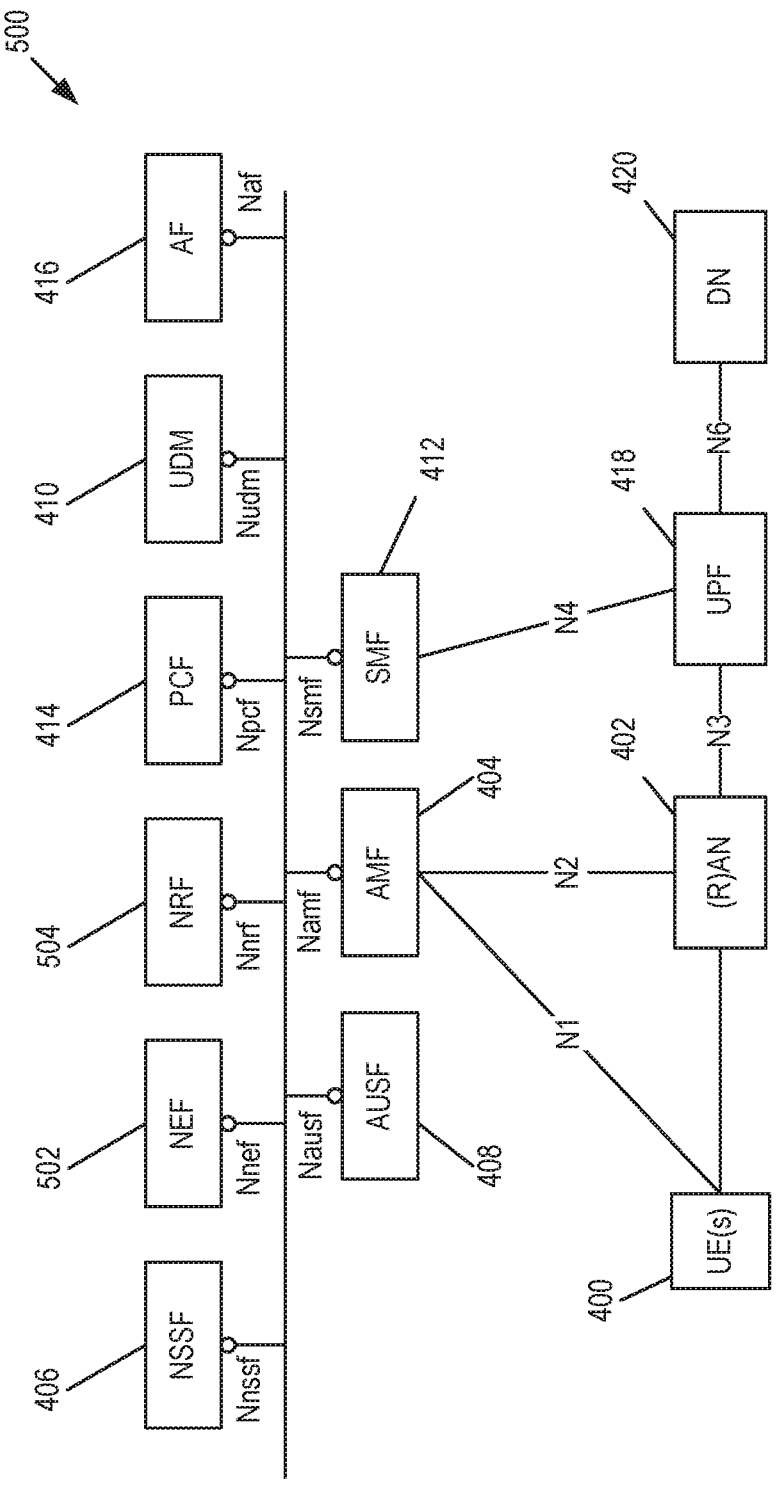
FIG. 5 illustrates a 5G network architecture using service-based interfaces between the NFs in the control plane, instead of the point-to-point reference points/interfaces used in the 5G network architecture of FIG. 4.

FIG. 5 illustrates a 5G network architecture 500 using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s), etc. that a NF provides to other authorized NFs can be exposed to the authorized NFs through the service-based interface. In FIG. 5 the service based interfaces are indicated by the letter "N" followed by the name of the NF, e.g., Namf for the service based interface of the AMF, Nsmf for the service based interface of the SMF, etc. The Network Exposure Function (NEF) 502 and the Network Function (NF) Repository Function (NRF) 504 in FIG. 5 are not shown in FIG. 4 discussed above. However, it should be clarified that all NFs depicted in FIG. 4 can interact with the NEF 502 and the NRF 504 of FIG. 5 as necessary, though not explicitly indicated in FIG. 4.

Some properties of the NFs shown in FIGS. 4 and 5 may be described in the following manner. The AMF 404 provides UE-based authentication, authorization, mobility management, etc. A UE 400 even using multiple access technologies is basically connected to a single AMF 404 because the AMF 404 is independent of the access technologies. The SMF 412 is responsible for session management and allocates Internet Protocol (IP) addresses to UEs 400. It also selects and controls the UPF 418 for data transfer. If a UE 400 has multiple sessions, different SMFs 412 may be allocated to each session to manage them individually and possibly provide different functionalities per session. The AF 416 provides information on the packet flow to the PCF 414 responsible for policy control to support Quality of Service (QOS). Based on the information, the PCF 414 determines policies about mobility and session management to make the AMF 404 and SMF 412 operate properly. The AUSF 408 supports authentication function for UEs 400 or similar and thus stores data for authentication of UEs 400 or similar while the UDM 410 stores subscription data of the UE 400. The DN 420, not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 6:
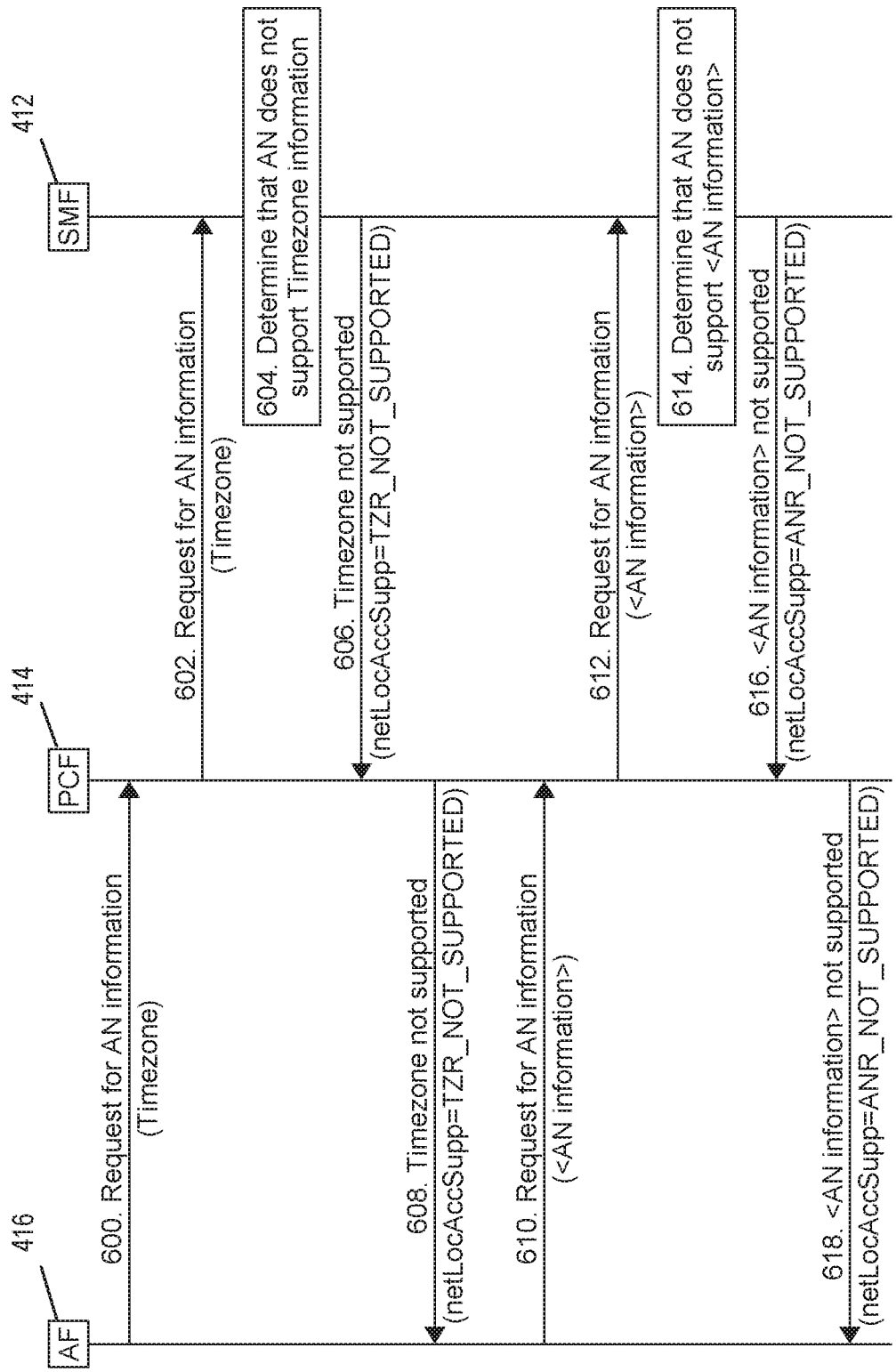
FIG. 6 illustrates an exemplary method for partial access of network information according to some embodiments of the present disclosure.

FIG. 6 illustrates an exemplary method for partial access of network information according to some embodiments of the present disclosure. In the embodiment illustrated in FIG. 6, an Application Function (AF) 416 seeks Access Network (AN) information that is not supported by the AN 402, resulting in the following steps:

Step 600. The AF 416 sends a request for AN information to a PCF 414. In this example, the AF 416 requests timezone information, e.g., for a particular UE 400.

Step 602. The PCF 414 forwards the request to an SMF 412.

Step 604. The SMF 412 determines that the AN 402 does not support reporting of timezone information. The SMF 412 may know this deficiency in advance, or it may query the AN 402 or a core network node that maintains this information to determine this deficiency.

Step 606. The SMF 412 notifies the PCF 414 that the AN 402 does not support reporting of timezone information. In some embodiments, the netLocAccSupp attribute is set to "TZR_NOT_SUPPORTED."

Step 608. The PCF 414 forwards that message to the AF 416. In this manner, the AF 416 is notified that the AN 402 does not support reporting timezone information. This can prevent the AF 416 from making false assumptions about the UE's timezone.

The same principle can be applied to any type of AN information that the AF 416 may request, as shown by the next sequence of messages:

Step 610. The AF 416 sends another request to the PCF 414, this time for AN information other than the timezone. This "other AN information" is represented generically as "<AN information>" in FIG. 6.

Step 612. The PCF 414 forwards the request for <AN information> to the SMF 412.

Step 614. The SMF 412 determines that the AN 402 does not support reporting of this specific <AN information>. The SMF 412 may know this deficiency in advance, or it may query the AN 402 or a core network node that maintains this information to determine this deficiency.

Step 616. The SMF 412 notifies the PCF 414 that the AN 402 does not support reporting of <AN information>.

Step 618. The PCF 414 forwards that message to the AF 416. In this manner, the AF 416 is notified that the AN 402 does not support reporting of <AN information>.

Figure 7:
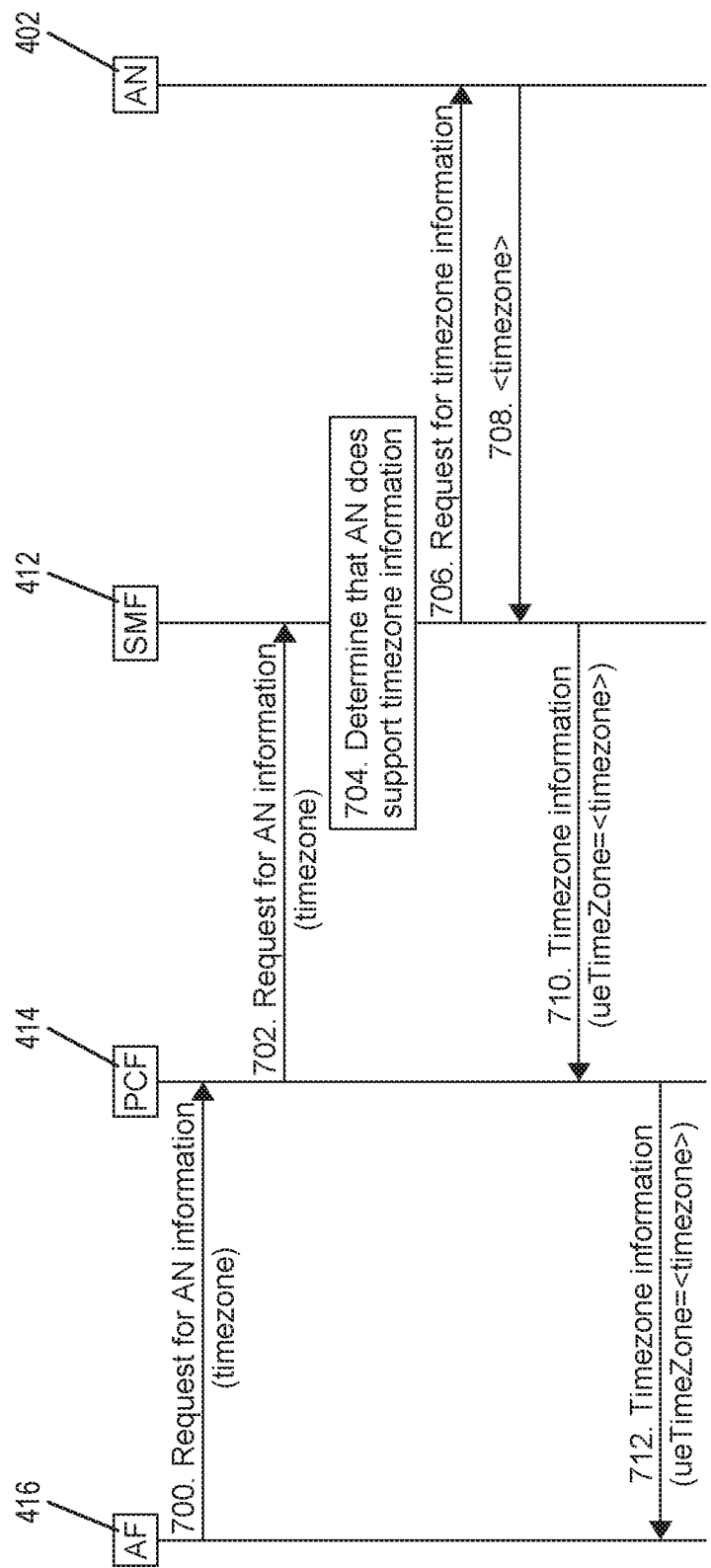
FIG. 7 illustrates an exemplary method for partial access of network information according to some embodiments of the present disclosure.

FIG. 7 illustrates an exemplary method for partial access of network information according to some embodiments of the present disclosure. In the embodiment illustrated in FIG. 7, an AF 416 seeks AN information that is supported by the AN 402, resulting in the following steps:

Step 700. The AF 416 sends a request for AN information to a PCF 414. In this example, the AF 416 requests timezone information, e.g., for a particular UE 400.

Step 702. The PCF 414 forwards the request to an SMF 412.

Step 704. The SMF 412 determines that the AN 402 supports reporting of timezone information. The SMF 412 may know this functionality in advance, or it may query the AN 402 or a core network node that maintains this information to determine this functionality.

Step 706. The SMF 412 sends a request for timezone information to the AN 402.

Step 708. The SMF 412 receives the timezone information from the AN 402.

Step 710. The SMF 412 forwards the timezone information to the PCF 414, e.g., via the "ueTimeZone" parameter.

Step 712. The PCF 414 forwards the timezone information to the AF 416.

The steps illustrated in FIGS. 6 and 7 are not currently described in existing 3GPP standards. Thus improvements with regards to the current functionality in the interface between the PCF and the SMF that could be made to the existing standards are possible and set forth below:

PCF Request and Report of Access Network Information in the SMF

If the NetLoc functionality is supported by both the SMF 412 and PCF 414, the PCF 414 may request the SMF 412 to report the access network information. If the AN_INFO policy control request trigger is set, upon receiving the "lastReqRuleData" attribute with the "reqData" attribute with the value(s) MS_TIME_ZONE and/or USER_LOC_INFO and the "refPccRuleIds" attribute containing the PCC rule identifier(s) corresponding to the PCC rule(s) which is being installed, modified, or removed together, the SMF 412, in an exemplary aspect, shall check if the access network 402 supports the required information:

If the SMF 412 determines that the access network 402 does not support the access network information reporting based on the feature support, the SMF 412 shall immediately inform the PCF 414 by including the "netLocAccSupp" attribute set to "ANR_NOT_SUPPORTED" value in the "UeCampingRep" data structure returned in the "200 OK" response to the policy update notification request.

Otherwise:
a) If the "reqData" attribute includes the MS_TIME_ZONE value and the SMF 412 determines that the access network 402 does not support the report of the UE time zone, the SMF 412 shall immediately inform the PCF 414 by including the "netLocAccSupp" attribute set to "TZR_NOT_SUPPORTED" value in the "UeCampingRep" data structure returned in the "200 OK" response to the policy update notification request.

b) If the "reqData" attribute includes:
1) the USER_LOC_INFO value; and/or
2) the MS_TIME_ZONE value and the SMF 412 determines the access network 402 supports the report of UE time zone,
3) then the SMF 412 shall apply appropriate procedures to the EPC access network to obtain the requested access network information as described below.

It should be appreciated that non-support of access network reporting can occur in the interworking scenarios, when the SMF 412 corresponds to an SMF+PGW-C and the access network 402 does not support the reporting of timezone information (Non-3GPP Untrusted Access).

In an exemplary aspect, if access network reporting is supported, the SMF 412 shall apply the Namf_EventExposure service with One-Time Report type as defined in subclause 5.3.1 of 3GPP TS 29.518 if the related information is not available to obtain this information. When the SMF 412 then receives access network information from the AMF 404, the SMF 412 shall provide the required access network information to the PCF 414 by as defined in subclause 4.2.4.1 and set the corresponding attributes as follows:

If the user location information was requested by the PCF 414 and was provided to the SMF 412, the SMF 412 shall provide the user location information within the "userLocationInfo" attribute and the time when it was last known within "userLocationInfoTime" attribute (if available).

If the user location information was requested by the PCF 414 and was not provided to the SMF 412, the SMF 412 shall provide the serving public land mobile network (PLMN) identifier and for standalone non-public network (SNPN) also the network identifier (NID) within the "servingNetwork" attribute.

If the time zone was requested by the PCF 414 and received by the SMF 412, it shall provide it within the "ueTimeZone" attribute.

In addition, the SMF 412 shall provide the AN_INFO policy control request trigger within the "repPolicyCtrlReqTriggers" attribute.

The SMF 412 shall not report any subsequent access network information updates received from the RAN 402 without any further provisioning or removal of related PCC rules requesting the access network information unless the associated QoS flow or protocol data unit (PDU) session has been released.

PCF Reporting Access Network Information to the AF

This procedure is used by the PCF 414 to report the access network information (i.e., user location and/or user timezone information) to the AF 416 when the "NetLoc" feature is supported.

When the PCF 414 receives the access network information from the SMF 412, the PCF shall include the "Events-Notification" data type in the body of the HTTP POST request message sent to the AF 416 as described in subclause 4.2.5.2 of TS 29.514. The PCF 414 shall include in the "EventsNotification" data type:

In case of 3GPP access, the user location information in the "eutraLocation" or in the "nrLocation" attribute in the "ueLoc" attribute, if available and required, or in case of untrusted non-3GPP access, the user location information in the "n3gaLocation" attribute in the "ueLoc" attribute, if required, as follows:
  a) the user local IP address in the "ueIpv4Addr" or "ueIpv6Addr" attribute, if available;
  b) the user datagram protocol (UDP) source port in the "portNumber" attribute if available; and
  c) the transmission control protocol (TCP) source port in the "portNumber" attribute if available;

In case of trusted non-3GPP access, the user location information in the "n3gaLocation" attribute in the "ueLoc" attribute, if required, as follows:
  a) the user local IP address in the "ueIpv4Addr" or "ueIpv6Addr" attribute, if available;
  b) the UDP source port in the "portNumber" attribute if available;
  c) the TCP source port in the "portNumber" attribute if available; and
  d) the trusted WLAN access point (TNAP) identifier, that shall consist of:
    i. the service set identifier (SSID) in the "ssId" attribute;
    ii. the basic SSID (BSSID) the "bssId" attribute if available; and
    iii. the TNAP civic address in the "tnapCivicAddress" attribute if available;
  the serving PLMN network code and country code in the "plmnId" attribute, if user location information is required but not available in any access;
  the UE time zone in the "ueTimeZone" attribute if required and available; and/or
  the "netLocAccSupp" attribute set to "TZR_NOT_SUPPORTED" value, if UE timezone information is required but not available in current access.

When the PCF 414 receives notification from the SMF 412 that the access network 402 does not support access network information report, the PCF 414 shall include the "netLocAccSupp" attribute set to "ANR_NOT_SUPPORTED" value in the "EventsNotification" data type in the body of the HTTP POST request message sent to the AF 416 as described in subclause 4.2.5.2 of TS 29.514.

The PCF 414 shall also include an event of the "AfEventNotification" data type in the "evNotifs" attribute with the "event" attribute set to the value "ANI_REPORT." Note that the PCF 414 receives the access network information from the SMF 412 if it is previously requested by the AF 416 or at PDU session termination or at the termination of all the service data flows of the AF session.

The PCF 414 shall not invoke the Npcf_PolicyAuthorization_Notify service operation with the "event" attribute set to the value "ANI_REPORT" to report to the AF 416 any subsequently received access network information, unless the AF 416 sends a new request for access network information.

Example embodiments of at least some aspects of the present disclosure are illustrated in FIGS. 13A-13H as changes to 3GPP TS 29.512 V15.6.0. Changes are indicated by underlining, strike-throughs, or by being otherwise noted.

Example embodiments of at least some aspects of the present disclosure are illustrated in FIGS. 14A-14I as changes to 3GPP TS 29.512 V16.3.0. Changes are indicated by underlining, strike-throughs, or by being otherwise noted.

Example embodiments of at least some aspects of the present disclosure are illustrated in FIGS. 15A-15M as changes to 3GPP TS 29.514 V16.3.0. Changes are indicated by underlining, strike-throughs, or by being otherwise noted.

Example Implementations

Figure 8:
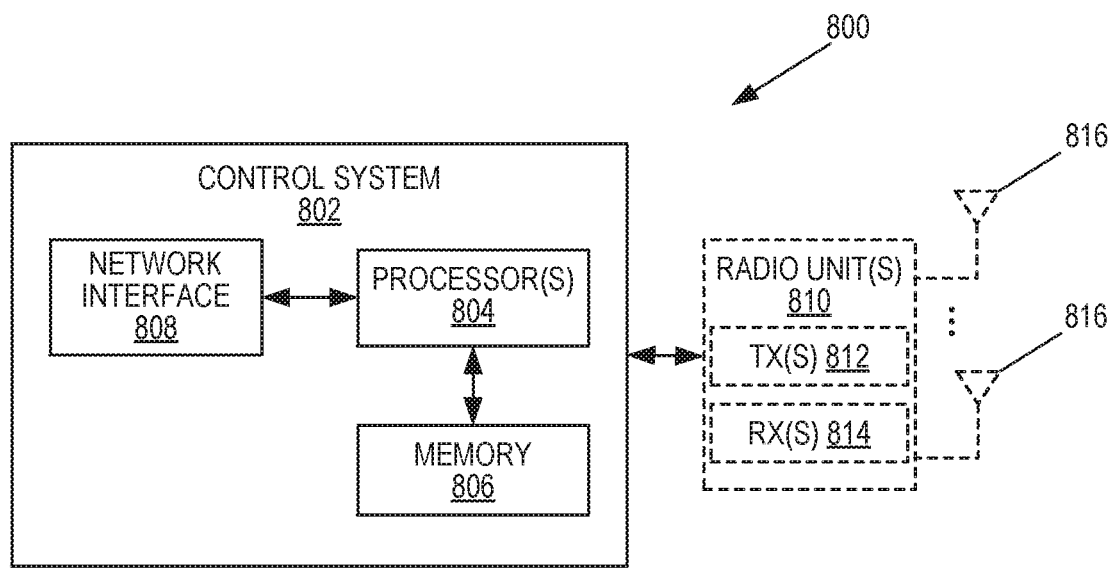
FIG. 8 is a schematic block diagram of a network node, and particularly a network node according to some embodiments of the present disclosure.

FIG. 8 is a schematic block diagram of a network node 800 according to some embodiments of the present disclosure. Optional features are represented by dashed boxes. The network node 800 may be, for example, a radio access node such as a base station 302 or 306 or other node that implements all or part of the functionality described herein. As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the network node 800 may include one or more radio units 810 (if the network node 800 is a radio access node such as a base station 302) that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a network node 800 as described herein. In some embodiments, the function(s) are implemented in software that is stored, e.g., in the memory 806 and executed by the one or more processors 804.

Figure 9:
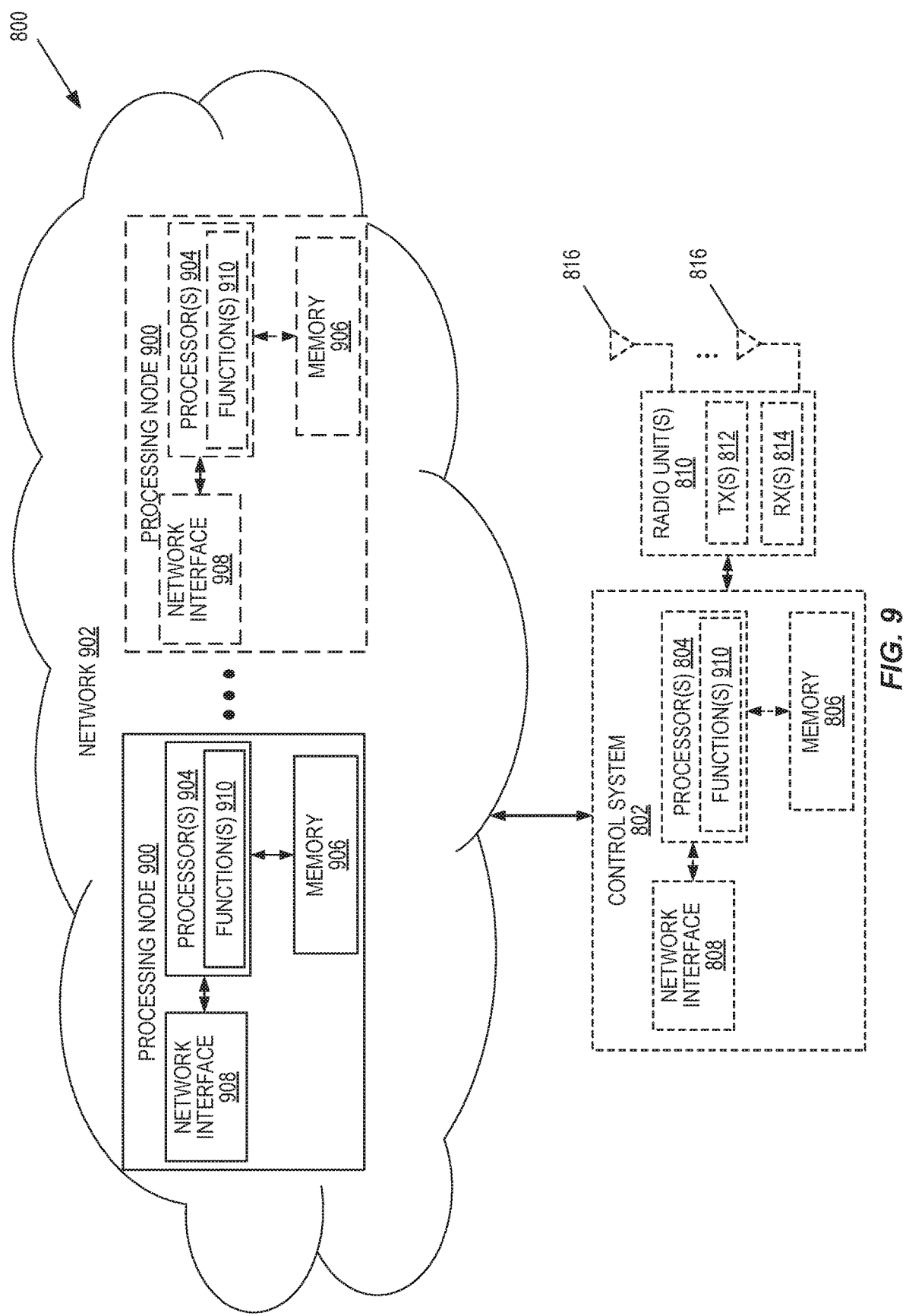
FIG. 9 is a schematic block diagram that illustrates a virtualized embodiment of a network node of FIG. 8 according to some embodiments of the present disclosure.
Figure 11:
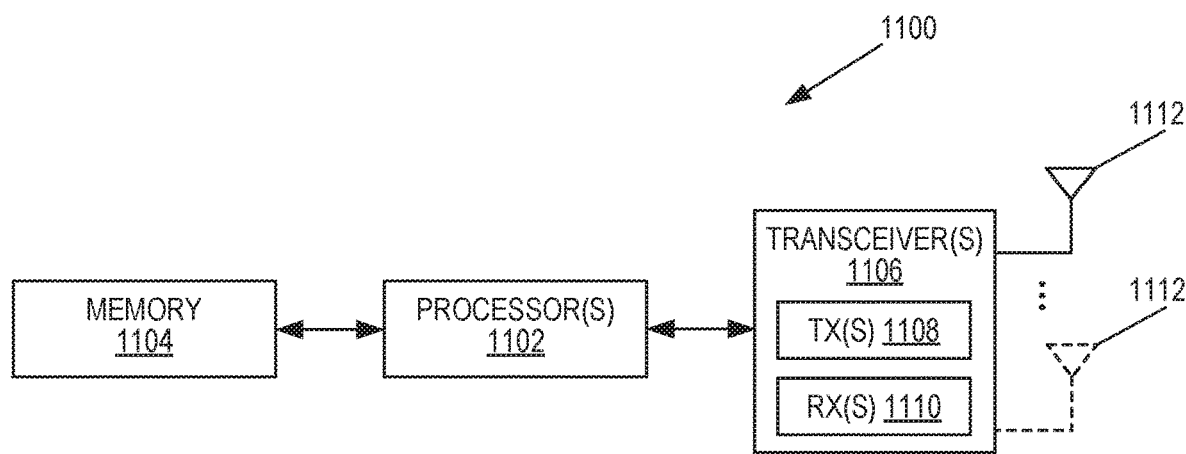
FIG. 11 is a schematic block diagram of a UE according to some embodiments of the present disclosure.
Figure 12:
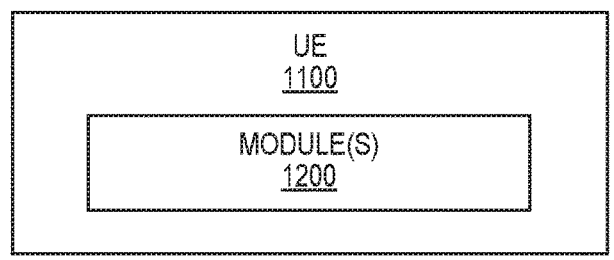
FIG. 12 is schematic block diagram of the UE of FIG. 11 according to some embodiments of the present disclosure.

FIG. 9 is a schematic block diagram that illustrates a virtualized embodiment of the network node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 may include the control system 802 and/or the one or more radio units 810 (if the node 800 is a radio access node), as described above. The control system 802 may be connected to the radio unit(s) 810 via, for example, an optical cable or the like. The network node 800 includes one or more processing nodes 900 coupled to or included as part of a network(s) 902. If present, the control system 802 or the radio unit(s) are connected to the processing node(s) 900 via the network 902. Each processing node 900 includes one or more processors 904 (e.g., CPUs, ASICs, FPGAS, and/or the like), memory 906, and a network interface 908.

In this example, functions 910 of the network node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
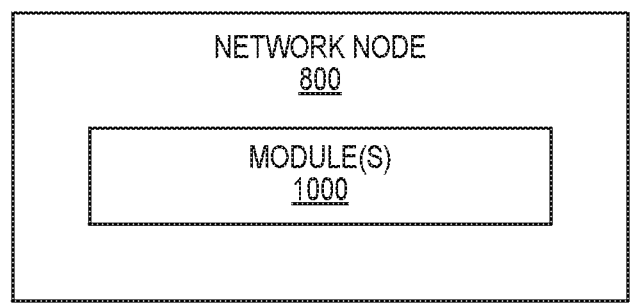
FIG. 10 is a schematic block diagram of the network node of FIG. 8 according to some other embodiments of the present disclosure.

FIG. 10 is a schematic block diagram of the network node 800 according to some other embodiments of the present disclosure. The network node 800 includes one or more modules 1000, each of which is implemented in software. The module(s) 1000 provide the functionality of network node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

SMF Embodiments

Embodiment 1: A method performed by a Session Management Function, SMF, for providing Access Network, AN, information, the method comprising:
  receiving (602,612,702), from a Policy Control Function, PCF, a request for AN information;
  determining (604, 614, 704) whether the AN does not support reporting of the requested AN information;
  upon determining that the AN does not support reporting of the requested AN information, sending (606, 616), to the PCF, a notification that the AN does not support reporting of the requested AN information; and
  upon determining that the AN does support reporting of the requested AN information:
    acquiring (706,708) the requested AN information; and
    sending (710) the requested AN information to the PCF.

Embodiment 2: The method of embodiment 1, wherein sending (606,616) the notification that the AN does not support the reporting the requested AN information comprises sending a UeCampingRep data structure.

Embodiment 3: The method of embodiment 2, wherein sending the notification that the AN does not support the reporting the requested AN information comprises sending (616) a UeCampingRep data structure having a netLocAccSupp attribute set to an ANR_NOT_SUPPORTED value.

Embodiment 4: The method of embodiment 2, wherein the requested AN information comprises User Equipment, UE, location information or timezone information, and wherein sending the notification that the AN does not support reporting the requested AN information comprises sending (606) a UeCampingRep data structure having a netLocAccSupp attribute set to an TZR_NOT_SUPPORTED value.

PCF Embodiments

Embodiment 5: A method performed by a Policy Control Function, PCF, for providing Access Network, AN, information, the method comprising:
  receive (600, 610, 700), from an Application Function, AF, a request for AN information;
  forwarding (602,612,702) the request to a Session Management Function, SMF;
  receiving (606,616,710), from the SMF, a response to the request; and
  forwarding (608,618,712) the response to the AF.

Embodiment 6: The method of embodiment 5, wherein the response from the SMF comprises an indication that the AN does not support reporting the requested AN information.

Embodiment 7: The method of embodiment 6, wherein the response from the SMF comprises a UeCampingRep data structure.

Embodiment 8: The method of embodiment 7, wherein the UeCampingRep data structure comprises a netLocAccSupp attribute set to an ANR_NOT_SUPPORTED value.

Embodiment 9: The method of embodiment 7, wherein the requested AN information comprises User Equipment, UE, location information or timezone information and wherein the UeCampingRep data structure comprises a netLocAccSupp attribute set to an TZR_NOT_SUPPORTED value.

AF Embodiments

Embodiment 10: A method performed by an Application Function, AF, for requesting Access Network, AN, information, the method comprising:
sending (600, 610, 700), to a Policy Control Function, PCF, a request for AN information; and
receiving (608, 618, 712), from the PCF, a response to the request for AN information, wherein the response includes the requested AN information or includes an indication that AN does not support reporting the requested AN information.

Embodiment 11: The method of embodiment 10, wherein the response from the PCF comprises a UeCampingRep data structure.

Embodiment 12: The method of embodiment 11, wherein the UeCampingRep data structure comprises a netLocAccSupp attribute set to an ANR_NOT_SUPPORTED value.

Embodiment 13: The method of embodiment 10, wherein the requested AN information comprises User Equipment, UE, location information or timezone information and wherein the UeCampingRep data structure comprises a netLocAccSupp attribute set to an TZR_NOT_SUPPORTED value.

Apparatus Embodiments

Embodiment 14: A Session Management Function, SMF, comprising:
processing circuitry configured to perform any of the steps of any of the SMF embodiments; and
power supply circuitry.

Embodiment 15: A Policy Control Function, PCF, comprising:
processing circuitry configured to perform any of the steps of any of the PCF embodiments; and
power supply circuitry.

Embodiment 16: An Application Function, AF, comprising:
processing circuitry configured to perform any of the steps of any of the AF embodiments; and
power supply circuitry.

At least some of the following abbreviations may be used in this disclosure. If there is an inconsistency between abbreviations, preference should be given to how it is used above. If listed multiple times below, the first listing should be preferred over any subsequent listing(s).
3GPP Third Generation Partnership Project
5G Fifth Generation
5GC Fifth Generation Core
5GS Fifth Generation System
AF Application Function
AMF Access and Mobility Management Function
AN Access Network
AP Access Point
ASIC Application Specific Integrated Circuit
AUSF Authentication Server Function
CPU Central Processing Unit
DL Downlink
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NPLI Network Provided Location Information
NR New Radio
NRF Network Function Repository Function
NSSF Network Slice Selection Function
OTT Over-the-Top
P-CSCF Proxy-Call Session Control Function
PC Personal Computer
PCC Policy and Charging Control
PCF Policy Control Function
PGW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. A method performed by a Session Management Function, SMF, for providing Access Network, AN, information including User Equipment, UE, timezone information, the method comprising:
receiving a request for reporting one or more of AN information including reporting of the UE timezone information, from a Policy Control Function, PCF;
determining whether an AN supports reporting of the requested AN information;
upon determining that the AN does not support reporting of the requested AN information, sending, to the PCF, a notification that the AN does not support reporting of the requested AN information, comprising sending a UeCampingRep data structure having a netLocAccSupp attribute set to:
an ANR_NOT_SUPPORTED value indicating reporting the requested AN information is not supported; or
a TZR_NOT_SUPPORTED value indicating reporting the UE timezone information is not supported; and upon determining that the AN does support reporting of the requested AN information:
  acquiring the requested AN information; and
  sending the requested AN information to the PCF.

2. The method of claim 1, wherein receiving the request for reporting one or more of AN information comprises receiving a request for user location information.

3. The method of claim 1 comprising sending the UeCampingRep data structure having the netLocAccSupp attribute set to the ANR_NOT_SUPPORTED value.

4. The method of claim 1 comprising sending the UeCampingRep data structure having the netLocAccSupp attribute set to the TZR_NOT_SUPPORTED value.

5. A method performed by a Policy Control Function, PCF, for providing Access Network, AN, information comprising User Equipment, UE, timezone information, the method comprising:
  receiving from an Application Function, AF, a request for AN information for reporting one or more of the AN information including reporting of the UE timezone information;
  forwarding the request to a Session Management Function, SMF;
  receiving, from the SMF, a response to the request comprising an indication that an AN does not support reporting the requested AN information, wherein the response from the SMF comprises a UeCampingRep data structure comprising a netLocAccSupp attribute set to:
    an ANR_NOT_SUPPORTED value indicating reporting the requested AN information is not supported; or
    a TZR_NOT_SUPPORTED value indicating reporting the UE timezone information is not supported; and
  forwarding the response to the AF.

6. The method of claim 5, wherein the netLocAccSupp attribute is set to the ANR_NOT_SUPPORTED value.

7. The method of claim 5, wherein the netLocAccSupp attribute is set to the TZR_NOT_SUPPORTED value.

8. A method performed by an Application Function, AF, for requesting Access Network, AN, information, the method comprising:
  sending a request for AN information comprising User Equipment, UE, timezone information to a Policy Control Function, PCF; and
  receiving, from the PCF, a response to the request for AN information, wherein the response includes the requested AN information or includes an indication that an AN does not support reporting the requested AN information,
  wherein the response from the PCF comprises a UeCampingRep data structure comprising a netLocAccSupp attribute set to:
    an ANR_NOT_SUPPORTED value indicating reporting the requested AN information is not supported; or
    a TZR_NOT_SUPPORTED value indicating reporting the UE timezone information is not supported.

9. The method of claim 8, wherein, when the response includes the netLocAccSupp attribute set to the ANR_NOT_SUPPORTED value.

10. The method of claim 8, wherein the response includes the netLocAccSupp attribute set to the TZR_NOT_SUPPORTED value.

11. A network node for implementing a Session Management Function, SMF, the network node comprising: processing circuitry configured to cause the network node to:
  receive, from a Policy Control Function, PCF, a request for reporting one or more of Access Network, AN, information including reporting of User Equipment, UE, timezone information;
  determine whether an AN supports reporting of the requested AN information;
  upon determining that the AN does not support reporting of the requested AN information, send to the PCF, a notification that the AN does not support reporting of the requested AN information, comprising sending a UeCampingRep data structure having a netLocAccSupp attribute set to:
    an ANR_NOT_SUPPORTED value indicating reporting the requested AN information is not supported; or
    a TZR_NOT_SUPPORTED value indicating reporting the UE timezone information is not supported; and
  upon determining that the AN does support reporting of the requested AN information:
    acquire the requested AN information; and
    send the requested AN information to the PCF.

12. The network node of claim 11, wherein the netLocAccSupp attribute is set to the ANR_NOT_SUPPORTED value.

13. The network node of claim 11, wherein the netLocAccSupp attribute is set to the TZR_NOT_SUPPORTED value.

14. A network node for implementing a Policy Control Function, PCF, the network node comprising:
  processing circuitry configured to cause the network node to:
  receive, from an Application Function, AF, a request for reporting one or more of Access Network, AN, information including reporting of User Equipment, UE, timezone information;
  forward the request to a Session Management Function, SMF;
  receive, from the SMF, a response to the request comprising an indication that an AN does not support reporting the requested AN information, wherein the response from the SMF comprises a UeCampingRep data structure comprising a netLocAccSupp attribute set to:
    an ANR_NOT_SUPPORTED value indicating reporting the requested AN information is not supported; or
    a TZR_NOT_SUPPORTED value indicating reporting the UE timezone information is not supported; and
  forward the response to the AF.

15. The network node of claim 14, wherein the netLocAccSupp attribute is set to the ANR_NOT_SUPPORTED value.

16. The network node of claim 14, wherein the requested AN information further comprises UE location information and wherein the netLocAccSupp attribute is set to the TZR_NOT_SUPPORTED value.

17. A network node for implementing an Application Function, AF, the network node comprising:
  processing circuitry configured to cause the network node to:
  send, to a Policy Control Function, PCF, a request for Access Network, AN, information comprising User Equipment, UE, timezone information; and receive, from the PCF, a response to the request for AN information, wherein the response includes the requested AN information or includes an indication that an AN does not support reporting the requested AN information, wherein the response from the PCF comprises a UeCampingRep data structure having a netLocAccSupp attribute set to:
- an ANR_NOT_SUPPORTED value indicating reporting the requested AN information is not supported; or
- a TZR_NOT_SUPPORTED value indicating reporting the UE timezone information is not supported.

18. The network node of claim 17, wherein the netLocAccSupp attribute is set to the ANR_NOT_SUPPORTED value.

19. The network node of claim 17, wherein the requested AN information comprises UE location information and wherein the netLocAccSupp attribute is set to the TZR_NOT_SUPPORTED value.

* * * * *